(12) United States Patent
Okabe

(10) Patent No.: US 7,631,186 B2
(45) Date of Patent: Dec. 8, 2009

(54) MOBILE TERMINAL AUTHENTICATION METHOD CAPABLE OF REDUCING AUTHENTICATION PROCESSING TIME AND PREVENTING FRAUDULENT TRANSMISSION/RECEPTION OF DATA THROUGH SPOOFING

(75) Inventor: Toshiya Okabe, Tokyo (JP)

(73) Assignee: NEC Corporation (JP)

( * ) Notice: Subject to any disclaimer, the term of this patent is extended or adjusted under 35 U.S.C. 154(b) by 691 days.

(21) Appl. No.: 10/994,853

(22) Filed: Nov. 22, 2004

(65) Prior Publication Data

US 2005/0113070 A1 May 26, 2005

(30) Foreign Application Priority Data

Nov. 21, 2003 (JP) ............................. 2003-391745

(51) Int. Cl.
H04L 9/32 (2006.01)
H04K 1/00 (2006.01)
(52) U.S. Cl. ........................................ 713/168; 380/247
(58) Field of Classification Search ................. 713/168; 380/247
See application file for complete search history.

(56) References Cited

U.S. PATENT DOCUMENTS 5,751,812 A * 5/1998 Anderson ................... 713/155

2004/0077335 A1 * 4/2004 Lee et al. .................... 455/410

FOREIGN PATENT DOCUMENTS

| JP | 2001-111544 | 4/2001 |
|---|---|---|
| JP | 2001-273257 | 10/2001 |
| JP | 2003-060653 | 2/2003 |
| JP | 2003-188885 | 7/2003 |

* cited by examiner

*Primary Examiner*—Kambiz Zand
*Assistant Examiner*—William S Powers
(74) *Attorney, Agent, or Firm*—Ostrolenk Faber LLP

(57) ABSTRACT

A mobile terminal transmits an N-th authentication key to an authentication server when the mobile terminal has moved from a coverage area under a certain radio access point to a coverage area under another radio access point. The N-th authentication key is generated by applying a hash function to a random number a number of times one smaller than an (N−1)th authentication key which was transmitted when the mobile terminal moved to the coverage area under the certain radio access point. Upon receipt of the N-th authentication key from the mobile terminal, the authentication server applies the hash function once to the N-th authentication key, and compares the result with the (N−1)th authentication key. Then, the authentication server determines that the authentication is successful when there is a match between both keys.

18 Claims, 11 Drawing Sheets

MOBILE TERMINAL AUTHENTICATION METHOD CAPABLE OF REDUCING AUTHENTICATION PROCESSING TIME AND PREVENTING FRAUDULENT TRANSMISSION/RECEPTION OF DATA THROUGH SPOOFING

BACKGROUND OF THE INVENTION

1. Field of the Invention

The present invention relates to a mobile wireless communication system for making communications between mobile terminals through a radio access point, and more particularly to a mobile terminal authentication technique for authenticating the validity of a mobile terminal.

2. Description of the Related Art

High-speed wireless data communication systems such as wireless LAN have become widespread for use in families and small offices for making communications between mobile terminals through a radio access point. An investigation is now under way to utilize this wireless technology for providing services in wider areas. However, for utilizing such a high-speed wireless data communication system as a public network, it is important to support advanced security and movements of mobile terminals.

On the other hand, an authentication method defined by IEEE802.1 has been known as a conventional authentication method for ensuring the security and supporting movements of mobile terminals. In this authentication method defined by IEEE802.1x, each time a mobile terminal moves to a coverage area under a different radio access point, i.e., each time a handover occurs, the mobile terminal sends a password to an authentication server which then authenticates the mobile terminal based on the password. However, the password-based authentication involves searching a database of the authentication server for user information registered therein, and therefore encounters difficulties in reducing the time required for the authentication.

To solve the foregoing problem, conventionally, JP-2003-188885-A, for example, has proposed a mobile wireless communication system as follows. This conventional mobile wireless communication system will be described with reference to a block diagram of FIG. 1.

Assume now that mobile terminal 101 exists in a coverage area under radio access point 102-1 of a plurality of radio access points 102-1-102-3 connected to network 104. For starting a communication in this state, mobile terminal 101 transmits its terminal ID to authentication server 103 through radio access point 102-1. Authentication server 103 determines whether or not it has preserved a WEP (Wired Equivalent Privacy) session key in correspondence to the terminal ID, i.e., mobile terminal 101 has already been authenticated. In this scenario, since mobile terminal 101 has not been authenticated, authentication server 103 requests mobile terminal 101 for a password. This causes mobile terminal 101 to transmit a password to authentication server 103 through radio access point 102-1. As authentication server 103 authenticates the validity of mobile terminal 101 based on the password, authentication server 103 generates a WEP session key which is transmitted to radio access point 102-1. In addition, authentication server 103 preserves the WEP session key in association with the terminal ID.

Afterwards, when mobile terminal 101 moves to a coverage area under radio access point 102-2, mobile terminal 101 sends the terminal ID to authentication server 103 through radio access point 102-2. In this way, authentication server 103 determines whether or not the WEP session key has been preserved therein in correspondence to the terminal ID. In this event, since authentication server 103 has preserved the WEP session key in correspondence to the terminal ID, i.e., the mobile terminal 101 has been authenticated, authentication server 103 instructs radio access point 102-1 to erase the WEP session key, and transmits the WEP session key to radio access point 102-2.

In the conventional mobile communication system described above, the transmission of a password and the password-based authentication are performed only at the start of communication, and a movement of a mobile terminal from one radio access point to another only entails the transmission of a terminal ID and a determination which is made as to whether or not the terminal ID has been registered. It is therefore possible to reduce the authentication processing time when a mobile terminal moves from one radio access point to another.

However, the conventional mobile communication system described above disadvantageously implies difficulties in preventing data transmission/reception through spoofing because once a mobile terminal is authenticated with a password, the mobile terminal transmits the terminal ID to the authentication server each time the mobile terminal moves from one radio access point to another, and the authentication server relies on the terminal ID for authentication. More specifically, in the conventional strategy described above, if a terminal ID can be intercepted, the intercepted terminal ID can be used to transmit/receive data, so that it is difficult to prevent the transmission/reception of data through spoofing.

SUMMARY OF THE INVENTION

It is therefore an object of the present invention to provide an authentication method which is capable of reducing a time required for authenticating a mobile terminal when it moves from one radio access point to another, and is also capable of preventing fraudulent data transmission/reception through spoofing.

The authentication method of the present invention is implemented in a mobile wireless communication system which includes a mobile terminal, a plurality of radio access points, and an authentication responsible device.

An authentication method of the present invention is used in a mobile wireless communication system which includes a mobile terminal, a plurality of radio access points, and an authentication responsible device.

In a first authentication method according to the present invention, the mobile terminal transmits an N-th authentication key to the authentication responsible device when an N-th handover occurs, where the N-th authentication key is generated by applying a hash function to a value given from the authentication responsible device a number of times different by a predetermined number of times from an (N−1)th authentication key transmitted when an (N−1)th handover occurred. Then, the authentication responsible device authenticates the validity of the mobile terminal based on whether or not the N-th authentication key sent from the mobile terminal and the (N−1)th authentication key previously sent from the mobile terminal satisfy a predetermined relationship.

The first authentication method according to the present invention can advantageously prevent fraudulent transmission/reception of data through spoofing. This is because the mobile terminal transmits to the authentication responsible device authentication keys which are generated by applying the hash function to the value given from the authentication responsible device numbers of times different by a predetermined number of times from each other when the (N−1)th handover occurs and when the N-th handover occurs. In other words, even if the authentication key is intercepted by a malicious third party, the third party encounters significant difficulties in estimating authentication keys to be used from then on, thereby making it possible to prevent the fraudulent transmission/reception of data through spoofing.

In a second authentication method according to the present invention, the mobile terminal generates an authentication key each time a handover occurs by applying a hash function to a value given from the authentication responsible device a number of times associated with the number of times the authentication key has been transmitted, and transmits the generated authentication key to the authentication responsible device. Then, the authentication responsible device authenticates the validity of the mobile terminal based on whether or not the current authentication key sent from the mobile terminal and a preceding authentication key sent from the mobile terminal satisfy a predetermined relationship.

The second authentication method according to the present invention can advantageously prevent the fraudulent transmission/reception of data through spoofing. This is because the hash function is applied to the value given from the authentication responsible device a number of times associated with the number of times the authentication key has been transmitted to generate an authentication key, each time a handover occurs, and the generated authentication key is transmitted from the mobile terminal to the authentication responsible device.

In a third authentication method according to the present invention, a random number is used for the value given from the authentication responsible device.

The third authentication method according to the present invention can advantageously prevent the fraudulent transmission/reception of data through spoofing with a higher security. This is because the value given from the authentication responsible device is a random number.

In a fourth authentication method according to the present invention, the authentication server transmits a challenge word to the mobile terminal, and the mobile terminal holds the challenge word sent from the authentication server, and transmits an N-th authentication key to the authentication server when an N-th handover occurs, where the N-th authentication key is generated by applying a hash function to the held challenge word a number of times different by a predetermined number of times from an (N−1)th authentication key transmitted when an (N−1)th handover has occurred. Then, the authentication server authenticates the validity of the mobile terminal when the N-th authentication key is sent from the mobile terminal, based on whether or not the N-th authentication key and the held (N−1)th authentication key have a predetermined relationship, and holds the N-th authentication key in place of the (N−1)th authentication key when the authentication is successful.

The fourth authentication method according to the present invention can advantageously reduce a time required for the authentication when the mobile terminal moves from one radio access point to another, and prevent the fraudulent transmission/reception of data through spoofing. This is because the N-th authentication key transmitted by the mobile terminal to the authentication server when the N-th handover occurs is generated by applying the hash function to the challenge word a number of times different by a predetermined number of times from the (N−1)th authentication key which was transmitted when the (N−1)th handover occurred, and the authentication server authenticates the validity of the mobile terminal based on whether or not the N-th authentication key sent from the mobile terminal and the (N−1)th authentication key held therein have a predetermined relationship. A fifth authentication method according to the present invention may be implemented in the fourth authentication method, wherein the hash function is a one-way function, and the N-th authentication key is generated by applying the hash function to the challenge word a number of times smaller by one than the (N−1)th authentication key. Then, the authentication server determines a successful authentication when the result of applying the hash function once to the N-th authentication key sent from the mobile terminal matches the held (N−1)th authentication key.

The fifth authentication method according to the present invention can advantageously prevent the transmission/reception of data through spoofing with higher security and extremely reduce the time required for the authentication. This is because the hash function is a one-way function, and the N-th authentication key is generated by applying the hash function to the challenge word a number of times smaller by one than the (N−1)th authentication key. Specifically, while an authentication key generated by applying the hash function to the challenge word (N+1) times or more can be estimated from an authentication key generated by applying the hash function to the challenge word N times, whereas an authentication key generated by applying the hash function to the challenge word (N−1) times or less cannot be practically estimated from the authentication key generated by applying the hash function to the challenge word N times, making it possible to reliably prevent the fraudulent transmission/reception of data through spoofing. Also, since the validity of the mobile terminal can be authenticated only by applying the hash function once to the received N-th authentication key and comparing the result with the held (N−1)th authentication key, it is possible to extremely reduce the time required for the authentication.

A sixth authentication method according to the present invention may be implemented in the fourth authentication method, wherein the mobile terminal transmits, when the N-th handover occurs, to the authentication server the N-th authentication key generated by applying the hash function to the challenge word a number of times smaller by one than the (N−1)th authentication key transmitted when the (N−1)th handover occurred, and an N-th sequence number which is larger by one than an (N−1)th sequence number transmitted when the (N−1)th handover occurred. The authentication server applies the hash function to the N-th authentication key a number of times in accordance with a difference between a held sequence number and the N-th sequence number when the N-th authentication key and sequence number are sent from the mobile terminal, determines that the authentication is successful when the result of applying the hash function to the N-th authentication key matches the held authentication key, and holds the N-th authentication key and sequence number in place of the held authentication key and sequence number.

The sixth authentication method according to the present invention can advantageously perform subsequent authentications correctly even if the authentication key is lost due to a possible trouble on a transmission path. This is because upon transmission of the N-th authentication key, the mobile terminal transmits to the authentication server a sequence number larger by one than the sequence number which was transmitted when the (N−1)th authentication key was transmitted, and the authentication server, upon receipt of the N-th authentication key and sequence number, applies the hash function to the N-th authentication key a number of times in accordance with the difference between a sequence number held at the time of the latest successful authentication and the N-th sequence number, and determines that the authentication is successful when the result matches the authentication key which has been held at the time of the latest successful authentication.

A seventh authentication method according to the present invention is applied to a mobile wireless communication system which includes a mobile terminal, a plurality of radio access points, an authentication server, and an authentication proxy switch disposed between the authentication server and the plurality of radio access points. In the seventh authentication method according to the present invention, the authentication server first authenticates the validity of the mobile terminal based on a password sent from the mobile terminal. Then, the authentication proxy switch transmits a local challenge to the mobile terminal, and the mobile terminal holds the local challenge sent from the authentication proxy switch, and transmits an N-th authentication key to the authentication proxy switch when an N-th handover occurs, wherein the N-th authentication key is generated by applying a hash function to the held local challenge a number of times different by a predetermined number of times from an (N−1)th authentication key transmitted when an (N−1)th handover occurred. Then, the authentication proxy switch authenticates the validity of the mobile terminal based on whether or not the N-th authentication key and the (N−1)th authentication key held therein have a predetermined relationship, when the N-th authentication key is sent from the mobile terminal, and holds the N-th authentication key in place of the (N−1)th authentication key when the authentication is successful.

The seventh authentication method according to the present invention can advantageously reduce the authentication processing time when the mobile terminal moves from one radio access point to another, and prevent the fraudulent transmission/reception of data through spoofing. This is because when an N-th handover occurs, the mobile terminal transmits to the authentication proxy switch the N-th authentication key which is generated by applying the hash function to the challenge word a number of times different by a predetermined number of times from the (N−1)th authentication key which was transmitted when the (N−1)th handover occurred, and the authentication proxy switch authenticates the validity of the mobile terminal based on whether or not the N-th authentication key sent from the mobile terminal and the (N−1)th authentication key held therein have a predetermined relationship.

An eighth authentication method according to the present invention may be implemented in the seventh authentication method, wherein one-way function is used for the hash function, and the N-th authentication key is generated by applying the hash function to the challenge word a number of times smaller by one than the (N−1)th authentication key. Then, the authentication proxy switch determines a successful authentication when the result of applying the hash function once to the N-th authentication key sent from the mobile terminal matches the held (N−1)th authentication key.

The eighth authentication method according to the present invention can advantageously prevent the transmission/reception of data through spoofing with higher security and extremely reduce the time required for the authentication. This is because the hash function is a one-way function, and the N-th authentication key is generated by applying the hash function to the challenge word a number of times smaller by one than the (N−1)th authentication key. Specifically, while an authentication key generated by applying the hash function to the challenge word (N+1) times or more can be estimated from an authentication key generated by applying the hash function to the challenge word N times, whereas an authentication key generated by applying the hash function to the challenge word (N−1) times or less cannot be practically estimated from the authentication key generated by applying the hash function to the challenge word N times, making it possible to reliably prevent the fraudulent transmission/reception of data through spoofing. Also, since the validity of the mobile terminal can be authenticated only by applying the hash function once to the received N-th authentication key and comparing the result with the held (N−1)th authentication key, it is possible to extremely reduce the time required for the authentication.

A ninth authentication method according to the present invention may be implemented in the seventh authentication method, wherein the mobile terminal transmits, when the N-th handover occurs, to the authentication proxy switch the N-th authentication key generated by applying the hash function to the local challenge a number of times smaller by one than the (N−1)th authentication key transmitted when the (N−1)th handover occurred, and an N-th sequence number which is larger by one than an (N−1)th sequence number transmitted when the (N−1)th handover occurred. Then, the authentication proxy switch applies the hash function to the N-th authentication key a number of times in accordance with a difference between a held sequence number and the N-th sequence number when the N-th authentication key and sequence number are sent from the mobile terminal, determines that the authentication is successful when the result of applying the hash function to the N-th authentication key matches the held authentication key, and holds the N-th authentication key and sequence number in place of the held authentication key and sequence number.

The ninth authentication method according to the present invention can advantageously perform subsequent authentications correctly even if the authentication key is lost due to a possible trouble on a transmission path. This is because upon transmission of the N-th authentication key, the mobile terminal transmits to the authentication proxy switch a sequence number larger by one than the sequence number which was transmitted when the (N−1)th authentication key was transmitted, and the authentication proxy switch, upon receipt of the N-th authentication key and sequence number, applies the hash function to the N-th authentication key a number of times in accordance with the difference between a sequence number held at the time of the latest successful authentication and the N-th sequence number, and determines that the authentication is successful when the result matches the authentication key which has been held at the time of the latest successful authentication.

The above and other objects, features and advantages of the present invention will become apparent from the following description with reference to the accompanying drawings which illustrate examples of the present invention.

DETAILED DESCRIPTION OF THE EMBODIMENTS

First Embodiment

Figure 1:
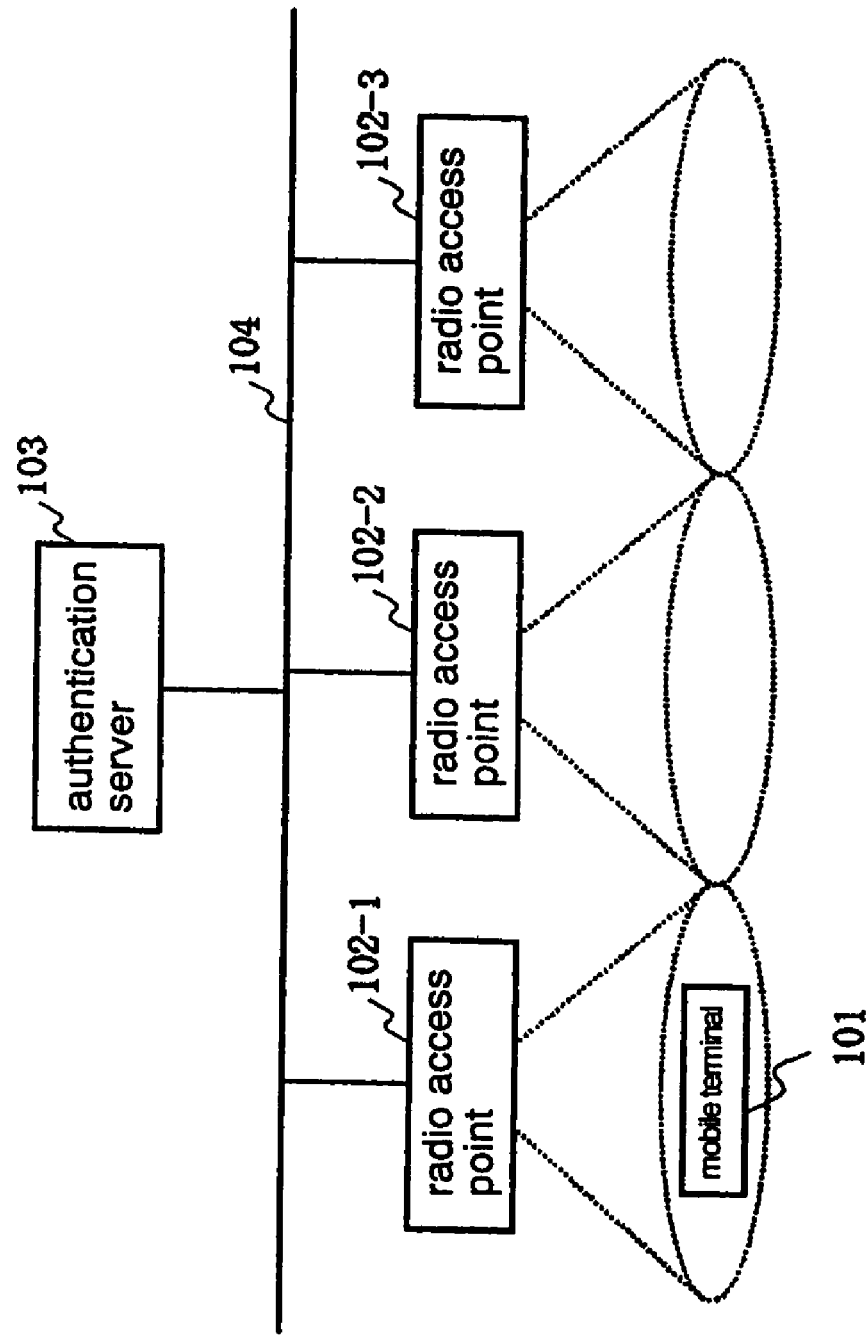
FIG. 1 is a block diagram for describing the prior art.
Figure 2:
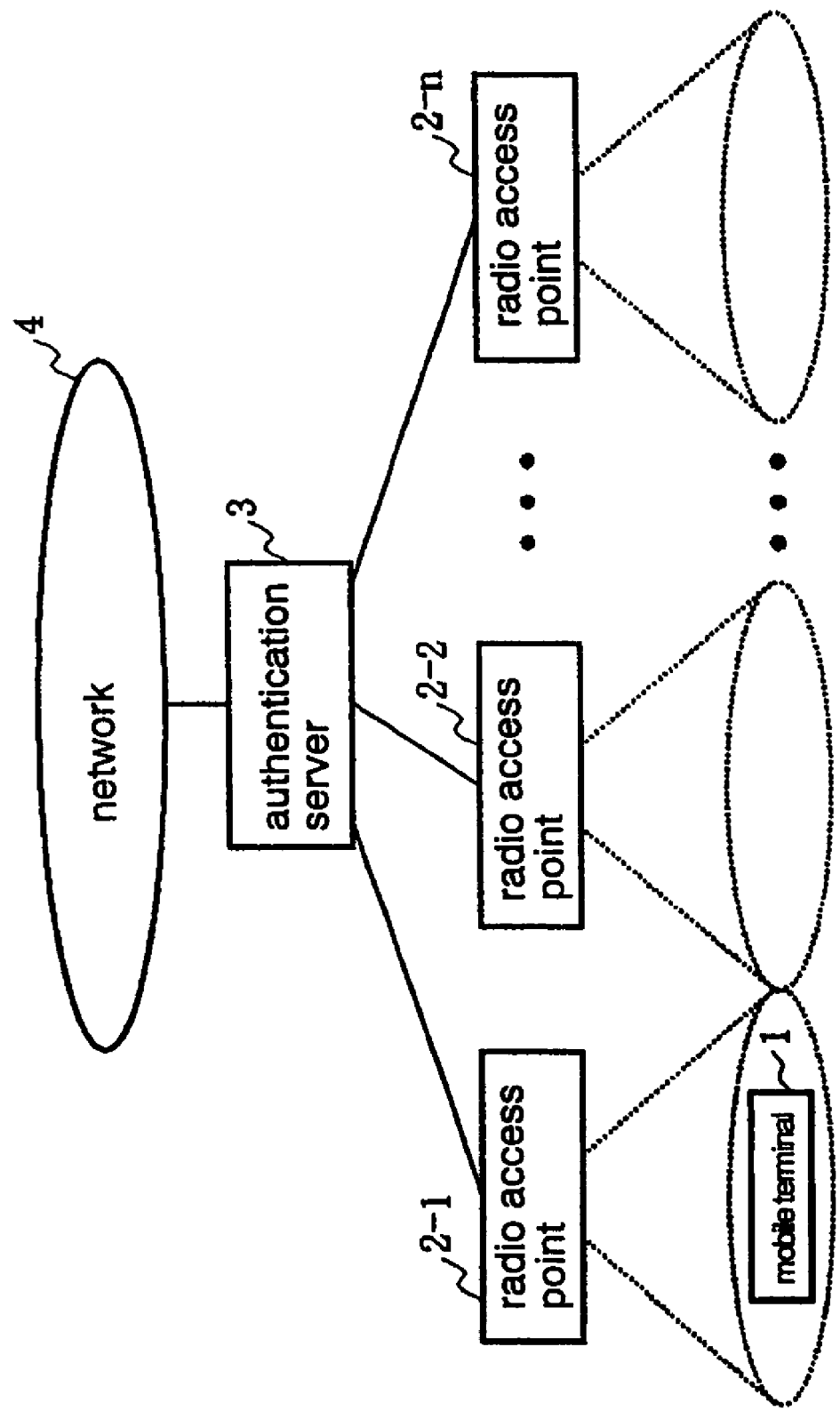
FIG. 2 is a block diagram generally illustrating an exemplary configuration of a first embodiment of a mobile wireless communication system according to the present invention.

FIG. 2 is a block diagram generally illustrating an exemplary configuration of a first embodiment of a mobile wireless communication system according to the present invention. Referring to FIG. 2, the mobile wireless communication system of this embodiment comprises mobile terminal 1, a plurality of radio access points 2-1-2-$n$, and authentication server 3 which is an authentication responsible device. Authentication server 3 is connected to network 4 such as an IP network. It should be understood that though there is only one mobile terminal 1 illustrated in FIG. 2, there are actually a plurality of mobile terminals existing in the system.

Mobile terminal 1 may be implemented by a personal computer (PC) or a personal digital assistant (PDA) which has a wireless interface represented by IEEE802.1. Mobile terminal 1 has a function of applying a hash function to a set of a challenge word (challenge-word) sent from authentication server 3 in an initial connection procedure and a password for authentication to generate an encrypted password hash value (challenge-word, password) and transmitting a control message including this encrypted password to authentication server 3; a function of applying the hash function to the challenge word a number of times associated with the number of times the control message is transmitted, when mobile terminal 1 moves from one radio access point to another (when a handover occurs), to generate a hash value, and transmitting to authentication server 3 a control message which includes the generated hash value as an authentication key; and the like.

Figure 3:
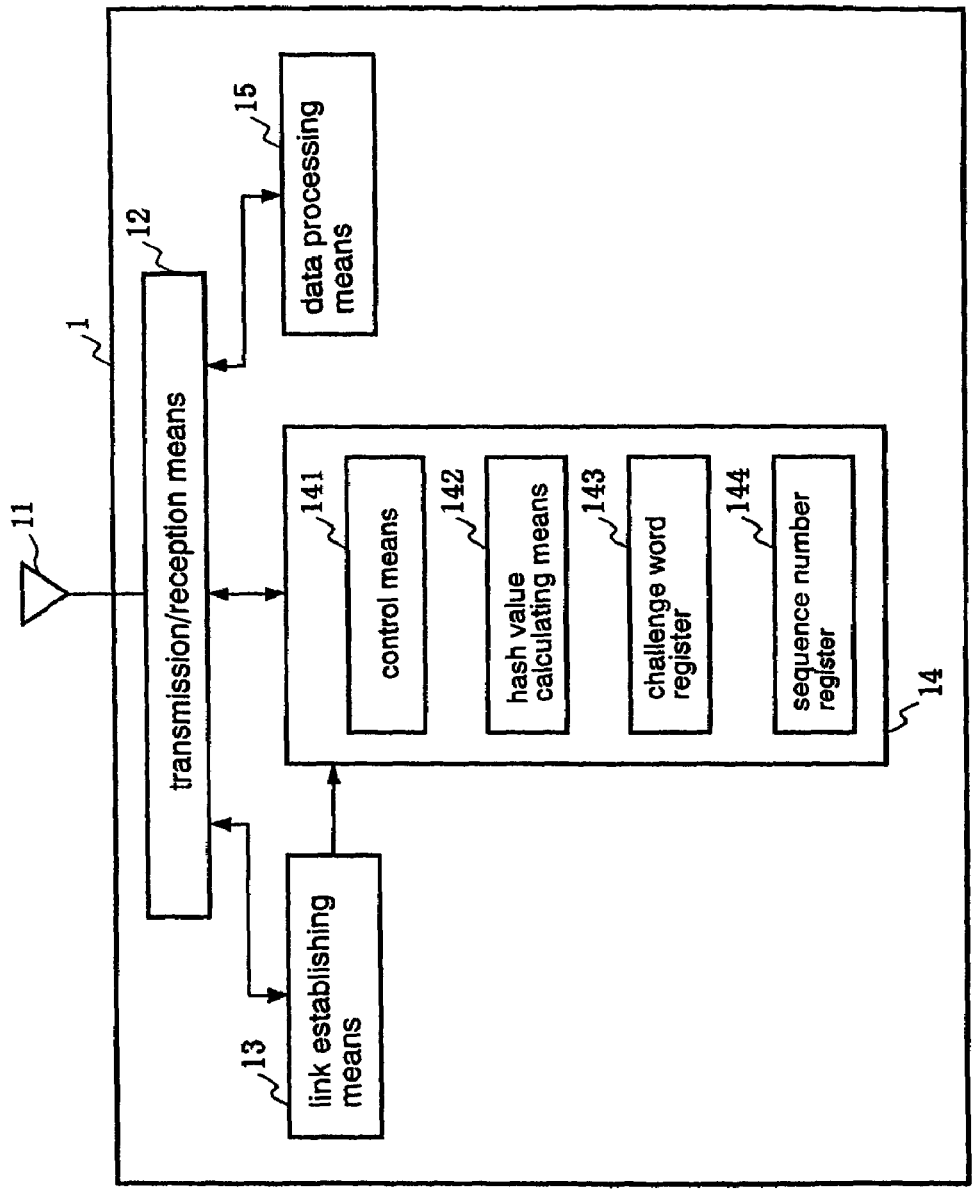
FIG. 3 is a block diagram illustrating an exemplary configuration of mobile terminal 1.

FIG. 3 illustrates an exemplary configuration of mobile terminal 1 in a block diagram form. Referring to FIG. 3, mobile terminal 1 comprises antenna 11, transmission/reception means 12, link establishing means 13, authentication requesting means 14, and data processing means 15.

Transmission/reception means 12 has a function of transmitting/receiving control messages, data packets, and the like. Link establishing means 13 has a function of establishing a link in a wireless section (between mobile terminal 1 and a radio access point).

Authentication requesting means 14 comprises control means 141, hash value calculating means 142, challenge word register 143, and sequence number register 144.

Control means 141 has the following functions (a)-(g):

(a) A function of transmitting an authentication request including a user ID (UID) to authentication server 3 when a link is established between mobile terminal 1 and radio access point 2-$i$ ($1 \leq i \leq n$) in the initial connection procedure.

Assume in this embodiment that the user ID includes the MAC address and user name of mobile terminal 1.

(b) A function of holding in challenge word register 143 challenge-word-1 for a first authentication cycle returned from authentication server 3 in response to an authentication request in the initial connection procedure. The authentication cycle will be described later.

(c) A function of applying a hash function once to a set of challenge-word-1 and a password to generate an encrypted password hash value (challenge-word-1, password) by making use of hash value calculating means 142 when challenge-word-1 for the first authentication cycle is returned from authentication server 3 in the initial connection procedure, applying the hash function to challenge-word-1 an initially set number N of times (N=1000 in this embodiment) to generate an authentication key hash value [1000] (challenge-word-1), and transmitting a control message, including the encrypted password hash value and authentication key hash value together with the user ID, to authentication server 3. For the hash function, a known one-way function is used, including MD5, SHA-1, and the like. Authentication server 3 also uses the same hash function as mobile terminal 1.

(d) A function of setting an initial value [1] for sequence number seqX in sequence number register 144 when a link is established between mobile terminal 1 and radio access point 2-$i$ ($1 \leq i \leq n$) in the initial connection procedure.

(e) A function of applying the hash function to challenge-word-M for an M-th authentication cycle held in challenge word register 143 a number of times calculated by subtracting sequence number seqX held in sequence number register 144 from 1000 to generate an authentication key hash value [1000-seqX] (challenge-word-M), and transmitting a seqX-th control message in the M-th authentication cycle, including the generated authentication key, user ID, and sequence number seqX, to authentication server 3, each time mobile terminal moves between radio access points in the M-th authentication cycle after the completion of the initial connection procedure.

(f) A function of incrementing sequence number seqX held in sequence number register 144 each time a control message is transmitted. Assume in this example that sequence number seqX is incremented by one (+1) each time a control message is transmitted. Also, when sequence number seqX exceeds [999] as a result of the increment, the control means 141 determines that the next authentication cycle is entered, and sets [1] in sequence number register 144.

(g) A function of applying the hash function 1000 times to new challenge-word-M+1 for an (M+1)th authentication cycle, when it is sent from authentication server 3 in the M-th authentication cycle, to generate a new authentication key hash value [1000] (new challenge-word-M+1), and transmitting a control message including the new authentication key as well to authentication server 3 when the control message is transmitted next time.

Data processing means 15 has a function of processing data packets.

When mobile terminal 1 is implemented by a computer, a program has been recorded in a disk, a semiconductor memory, or another recording medium for implementing transmission/reception means 12, link establishing means 13, authentication requesting means 14, and data processing means 15. The computer reads the program and controls its operations in accordance with the program to implement transmission/reception means 12, link establishing means 13, authentication requesting means 14, and data processing means 15 on the computer itself.

Radio access point **2-*i*** refers to an access point which has a wireless interface represented by IEEE802.11, and is involved in establishing a link in a wireless section, and relaying control packets and data packets after the establishment of a link.

Authentication server 3, which is implemented by a computer, has a function of generating a challenge word for transmission to mobile terminal 1; a function of authenticating mobile terminal 1 in accordance with an encrypted password sent from mobile terminal 1; a function of authenticating mobile terminal 1 in accordance with an authentication key sent from mobile terminal 1; and the like.

Figure 4:
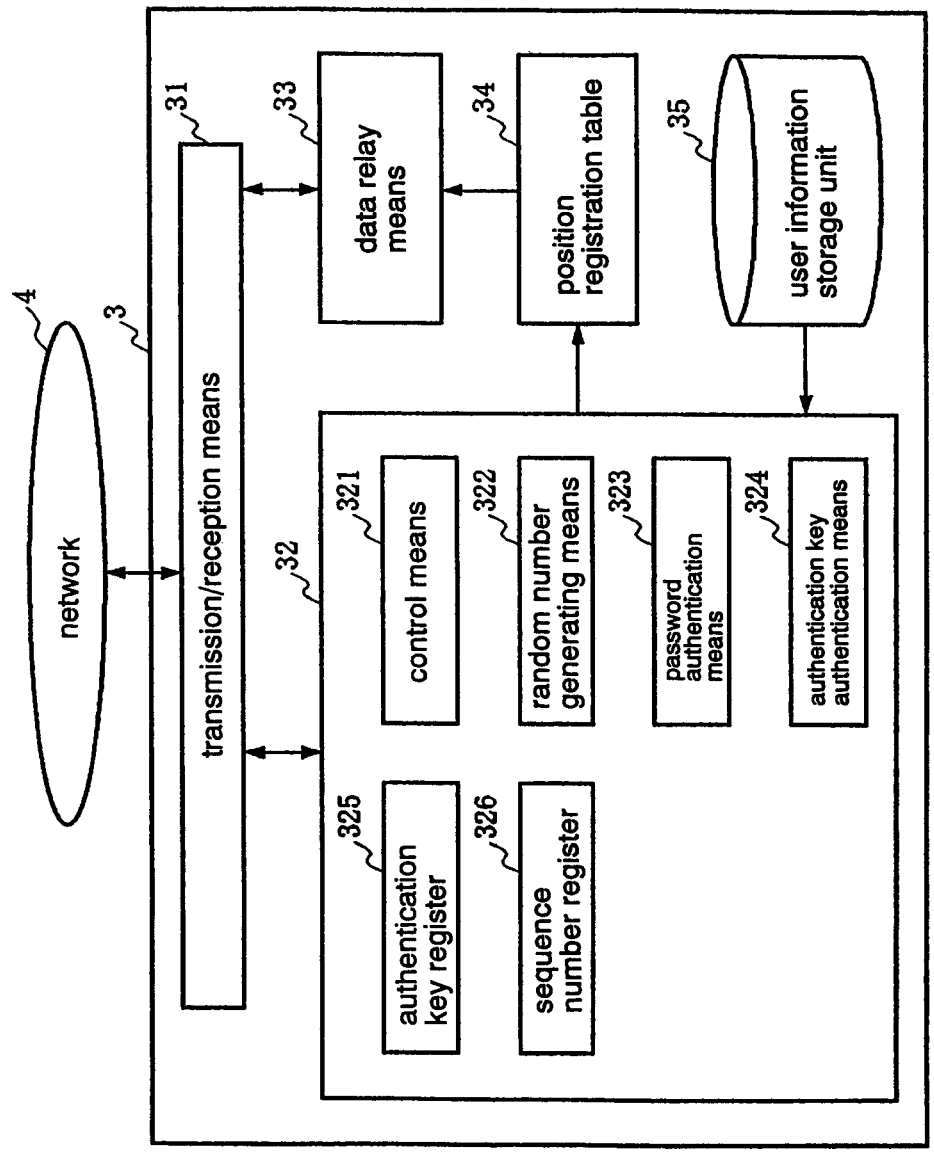
FIG. 4 is a block diagram illustrating an exemplary configuration of authentication server 3.

Authentication server 3, having such functions, is configured, for example, as illustrated in a block diagram of FIG. 4.

Referring to FIG. 4, authentication server 3 comprises transmission/reception means 31, authentication means 32, data relay means 33, position registration table 34, and user information storage unit 35.

Transmission/reception means 31 has a function of transmitting/receiving data. User information storage unit 35 is registered with a password in correspondence to the MAC address and user name of a mobile terminal.

Authentication means 32 comprises control means 321, random number generating means 322, password authentication means 323, authentication key authentication means 324, authentication key register 325, and sequence number register 326.

Control means 321 has functions as shown in the following (h)-(k):

(h) A function of generating challenge-word-1 for a first authentication cycle using random number generating means 322 when an authentication request is sent from mobile terminal 1 in the initial connection procedure, and returning the generated challenge word to mobile terminal 1.

(i) A function of authenticating mobile terminal 1 in accordance with an encrypted password and in accordance with an authentication key using password authentication means 323 and authentication key authentication means 324 when mobile terminal 1 sends a control message including an encrypted password hash value (challenge-word-1, password), an authentication key hash value [1000] (challenge-word-1), and a user ID, registering position registration table 34 with the MAC address of mobile terminal 1 in correspondence to a radio access point number which identifies radio access point **2-*i* under which mobile terminal 1 exists when the results of the authentications are both successful, notifying mobile terminal 1 of the successful authentication, registering authentication key register 325 with the MAC address of mobile terminal 1 in correspondence to the authentication key, and registering sequence number register 326 with the MAC address of mobile terminal 1** in correspondence to sequence number seqY=[0].

(j) A function of generating new challenge-word-M+1 for an (M+1)th authentication cycle using random number generating means 322 when sequence number seqY is [0] in the M-th authentication cycle, and transmitting the new challenge word when mobile terminal 1 is notified of the successful authentication. In this embodiment, a new challenge word is generated when sequence number seqY is [0], but the generation of a new password is not limited to this manner. A new challenge word may be generated only once while sequence number seqY is in a range of [0] to [998].

(k) A function of authenticating mobile terminal 1 based on an authentication key using authentication key authentication means 324 when mobile terminal 1 sends a control message including the authentication key, user ID, and sequence number seqX (mobile terminal transmits the control message during a handover) in the M-th authentication cycle, replacing a radio access point number registered in position registration table 34 in correspondence to the MAC address of mobile terminal 1 with a radio access point number of a radio access point which has relayed the control message when the authentication is successful, notifying mobile terminal 1 of the successful authentication, replacing the authentication key registered in authentication key register 325 in correspondence to the MAC address of mobile terminal 1 with the authentication key, and updating sequence number seqY registered in sequence number register 326 in correspondence to the MAC address of mobile terminal 1 to seqX. On the other hand, when the authentication fails, a function of deleting information related to mobile terminal 1 from position registration table 34, authentication key register 325, and sequence number register 326, and notifying mobile terminal 1 of the failed authentication.

Data relay means 33 has a function of delivering data packets, when sent thereto from mobile terminal 1, to network 4 on the condition that position registration table 34 has information related to mobile terminal 1 registered therein (on the condition that mobile terminal 1 has been authenticated), and transmitting data packets destined to mobile terminal 1 through network 4 to a radio access point under which mobile terminal 1 currently exists, with reference to position registration table 34.

When authentication server 3 is implemented by a computer, a program has been recorded in a disk, a semiconductor memory, or another recording medium for implementing transmission/reception means 31, authentication means 32, and data relay means 33. The computer reads the program and controls its operations in accordance with the program to implement transmission/reception means 31, authentication means 32, and data relay means 33 on the computer itself.

Next, the operation of the mobile wireless communication system according to the first embodiment will be described in detail.

Figure 5:
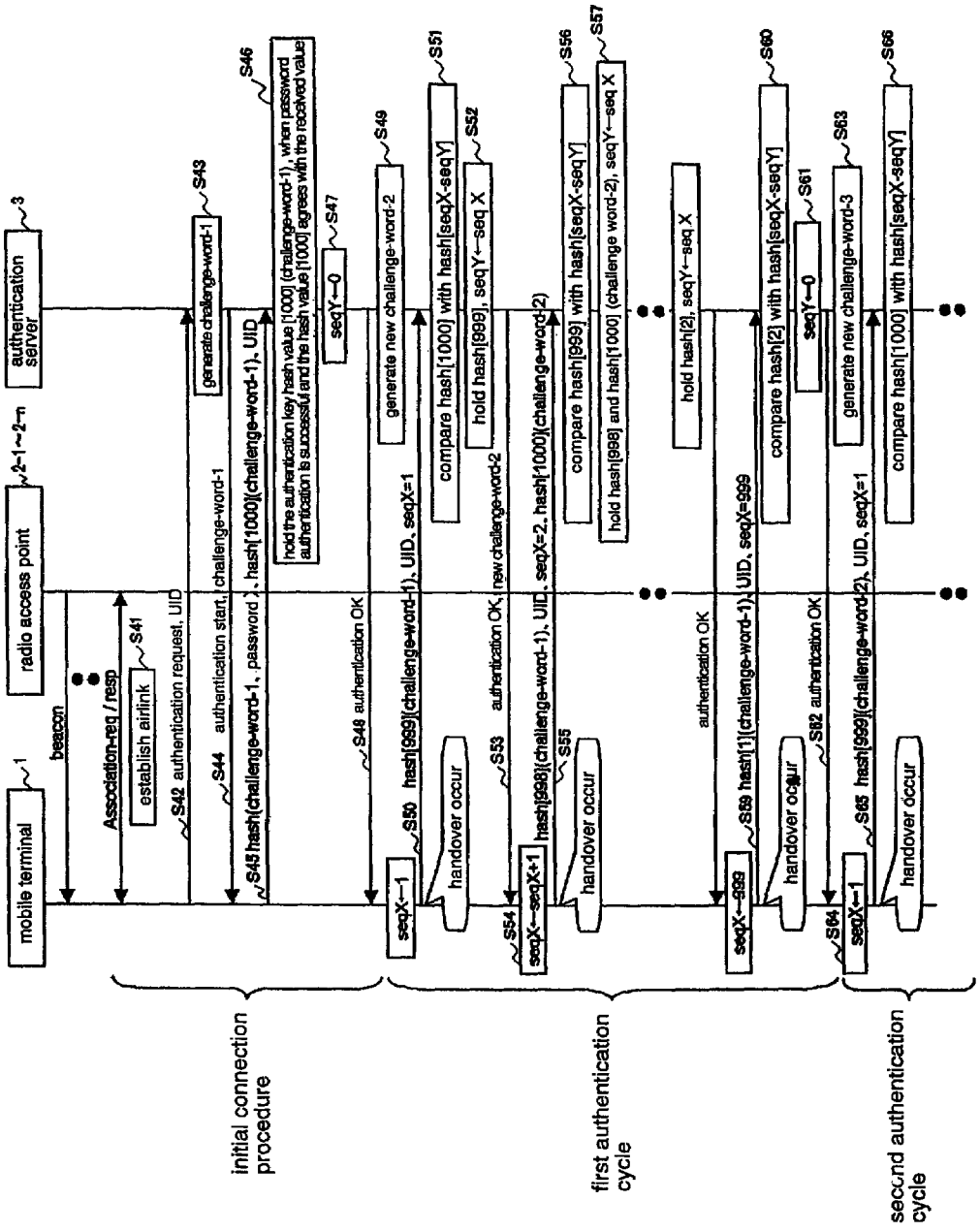
FIG. 5 is a flow chart illustrating an exemplary process in the first embodiment.

When a communication is started from mobile terminal 1 which exists within a coverage area (an area in which radio waves are accessible) of radio access point **2-*i*, a link is established in accordance with a wireless scheme (step S41 in FIG. 5). According to IEEE802.11, radio access point 2-*i* delivers a beacon signal at regular intervals (for example, at a period of 100 msec), such that link establishing means 13 in mobile terminal 1 which has received the beacon signal transmits an association request message to radio access point 2-*i*. In response, radio access point 2-*i* returns an association response message. In the foregoing procedure, a link is established in a wireless section. As a link is established in a wireless section, control means 141 sets an initial value [1] for sequence number seqX in sequence number register 144. After the establishment of the wireless link, the initial connection procedure is started. In the initial connection procedure, control means 141 in mobile terminal 1 first transmits an authentication request including the user ID to authentication server 3 through radio access point 2-*i* (step S42**).

Control means 321 in authentication server 3, upon receipt of the authentication request from mobile terminal 1, generates challenge-word-1 for a first authentication cycle using random number generating means 322, and returns the generated challenge word to mobile terminal 1 (steps S43, S44).

As challenge-word-1 is returned to mobile terminal 1, control means 141 in mobile terminal 1 generates an encrypted password hash value (challenge-word-1, password) and an authentication key hash value [1000] (challenge-word-1) making use of hash value calculating means 142, and transmits a control message, including the encrypted password hash value and authentication key hash value together with the user ID, to authentication server 3 (step S45). Further, at step 45, control means 141 sets challenge-word-1 sent from authentication server 3 in challenge word register 143. The encrypted password hash value (challenge-word-1, password) is a hash word generated by applying a hash function once to a set of a challenge word and a password, while the authentication key hash value [1000](challenge-word-1) is a hash value which is generated by applying the hash function to the challenge word an initially set number N of times (1000 times in this embodiment).

As the encrypted password hash value (challenge-word-1, password) and authentication hash value [1000] (challenge-word-1) are sent from mobile terminal 1, control means 321 in authentication server 3 authenticates mobile terminal 1 in accordance with the encrypted password using password authentication means 323, and also authenticates mobile terminal 1 in accordance with the authentication key using authentication key authentication means 324. Specifically, password authentication means 323 compares a hash value, which is generated by applying the hash function once to a set (challenge-word-1, password) of challenge-word-1 generated at step S43 and the password of mobile terminal 1 registered in user information storage unit 35, with the received encrypted password, and determines that the authentication is successful when there is a match between both values. On the other hand, authentication key authentication means 324 compares the hash value, which is generated by applying the hash function 1000 times to challenge-word-1 generated at step S43, with the received encrypted password, and determines that the authentication is successful when there is a match between both values. Then, when password authentication means 323 and authentication key authentication means 324 are both successful in the authentication, control means 321 registers position registration table 34 with the MAC address of mobile terminal 1 in correspondence to a radio access point number which identifies radio access point 2-*i* under which mobile terminal 1 currently exists, and holds the authentication key hash value [1000] (challenge-word-1) in correspondence to the MAC address of mobile terminal 1 in authentication key register 325 (step S46)). When the authentication fails, control means 321 notifies mobile terminal 1 to that effect.

Subsequently, control means 321 sets sequence number seqY=[0] in sequence number register 326 in correspondence to the MAC address of mobile terminal 1, and notifies mobile terminal 1 of the successful authentication (steps S47, S48). In the foregoing manner, the initial connection procedure is completed.

As the initial connection procedure is completed, a first authentication cycle is entered. In this embodiment, when the authentication based on an authentication key is performed [999] times in an M-th authentication cycle, the next (M+1)th authentication cycle is entered, in such a manner that as the authentication is performed [999] (=N−1) times based on the authentication key in the first authentication cycle, a second authentication cycle is entered.

As the first authentication cycle is entered, control means 321 in authentication server 3 generates new challenge-word-2 for the second authentication cycle making use of random number generating means 322 (step S49).

On the other hand, control means 141 in mobile terminal 1, upon occurrence of a handover after the first authentication cycle has been entered, generates an authentication key hash value [999] (challenge-word-1)=hash[1000-seqX] (challenge-word-1) making use of hash value calculating means 142, and transmits a control message, including the generated authentication key, user ID, and sequence number seqX=[1] held in sequence number register 144 to authentication server 3 (step S50). Subsequently, control means 141 increments sequence number seqX held in sequence number register 144 by one (+1) to [2] (step S54).

Control means 321 in authentication server 3, upon receipt of the control message from mobile terminal 1 at step S50, authenticates the authentication key hash value [999] (challenge-word-1) included in the control message making use of authentication key authentication means 324. Specifically, authentication key authentication means 324 applies the hash function to the authentication key hash value [999] (challenge-word-1) a number of times equal to (seqX-seqY) to find a hash value (in this example, since seqX=1 and seqY=0, the hash value is found by applying the hash function only once to the authentication key hash value [999] (challenge-word-1), compares this hash value with the authentication key hash value [1000](challenge-word-1) registered in authentication key register 325 in correspondence to the MAC address of mobile terminal 1, and determines that the authentication is successful if there is a match between both values (step S51). Here, the number of times the hash function is applied is chosen to be (seqX-seqY) times in order that subsequent authentication can be correctly carried out even if a control message fails to reach authentication server 3 due to a trouble on a transmission path or even if a response to a control message does not reach mobile terminal 1. At step S51, if the authentication fails, control means 321 deletes all information related to mobile terminal 1 registered in authentication key register 325, sequence number register 326, and position registration table 34, and then notifies mobile terminal 1 of the failed authentication.

Conversely, when the authentication is successful, control means 321 replaces the radio access point number of radio access point 2-*i* registered in position registration table 34 in correspondence to the MAC address of mobile terminal 1, with a radio access point number of destination radio access point 2-*j*, and replaces the authentication key and sequence number registered in authentication key register 325 and sequence number register 326 in correspondence to the MAC address of mobile terminal 1 with the authentication key hash value [999] (challenge-word-1) and sequence number seqX=[1] in the control message (step S52). Subsequently, control means 321 notifies mobile terminal 1 of the successful authentication and the new challenge-word-2 for the second authentication cycle, generated at step S49 (step S53).

When control means 141 in mobile terminal 1 is notified of the successful authentication and new challenge-word-2 at step 53, control means 141 additionally registers challenge-word-2 in challenge word register 143. Consequently, challenge word register 143 holds challenge-word 1 for use in the first authentication cycle, and challenge-word-2 for use in the second authentication cycle. When mobile terminal 1 is not notified of the successful authentication even though a predetermined time has elapsed from the transmission of the control message at step S50, mobile terminal 1 determines that the control message transmitted at step S50 has not reached authentication server 3 due to a possible trouble on a transmission path, and increments sequence number seqX by one (+1) (executes step S54), followed by transmission of a control message, including the authentication key hash number value [998] (challenge-word-1), user ID, and sequence number seqX=[2].

Subsequently, as mobile terminal 1 moves from radio access point 2-*j* to another radio access point (assume radio access point 2-*k*), control means 141 generates authentication key hash value [998] (challenge-word-1) and new authentication key hash value [1000] (challenge-word-2) making use of hash value calculating means 142, and transmits to authentication server 3 a control message which includes the generated authentication key hash value [998] (challenge-word-1) and new authentication key hash value [1000] (challenge-word-2), the user ID, and sequence number seqX=[2] held in sequence number register 144 (step S55).

Upon receipt of the control message which includes the authentication key hash value [1000] (challenge-word-2) in addition to the authentication key hash value [998] (challenge-word-1), control means 321 in authentication server 3 authenticates the authentication key hash value [998] (challenge-word-1), in a manner similar to step S51, using authentication key authentication means 324 (step S56). Then, when the authentication is successful, control means 321 writes the authentication key hash value [998] (challenge-word-1) and new authentication key hash value [1000] (challenge-word-2) over the information related to mobile terminal 1 held in authentication key register 325, replaces sequence number seqY=[1] for mobile terminal 1 held in sequence number register 326 with sequence number seqX=[2] included in the control message (step S57), and then notifies mobile terminal 1 of the successful authentication. As described above, when authentication server 3 receives the control message including the new authentication key hash value [1000] (challenge-word-2) and is successful in authentication, new challenge-word-2 will not be transmitted to mobile terminal 1 until the next authentication cycle is entered, but if the new authentication key hash value [1000] (challenge-word-2) is not included in the control message received for the first time after new challenge-word-2 has been transmitted at step S53, control means 321 authenticates mobile terminal 1 in accordance with the authentication key hash value [1000-seqX] (challenge-word-1), and notifies mobile terminal 1 of the successful authentication together with new challenge-word-2 as well, on the condition that the authentication is successful. Mobile terminal 1 performs the processing similar to the foregoing when it is notified of the successful authentication together with the new challenge word.

In the following, similar processing to the foregoing is performed each time a handover occurs.

Then, at step S59, after transmitting the control message, control means 141 increments sequence number seqX by one (+1), in which case sequence number seqX reaches [1000], so that control means 141 recognizes that the second authentication cycle has been entered, and sets [1] in sequence number register 144 (step S64). Also, at step S64, control means 141 deletes challenge-word-1, which has been used to generate the authentication key in the first authentication cycle, from challenge word register 143, such that control means 141 uses new challenge-word-2 for the second authentication cycle held in challenge word register 143 when it generates an authentication key from then on.

When the authentication is successful at step S60, control means 321 in authentication server 3 attempts to replace the sequence number for mobile terminal 1 registered in sequence number register 326 with sequence number seqX=[999] sent from mobile terminal 1. However, since sequence number seqX sent thereto is [999], control means 321 recognizes that the next authentication cycle (second authentication cycle) has been entered, and registers [0] in sequence number register 362 (step S61). Subsequently, control means 321 notifies mobile terminal 1 of the successful authentication, and generates new challenge-word-3 for use in a third authentication cycle using random number generating means 322 (steps S62, S63).

Also, if a handover occurs after the second authentication cycle has been entered, control means 141 of mobile terminal 1 generates an authentication key hash value [999] (challenge-word-2) using hash value calculating means 142, and transmits a control message, including the generated authentication key hash value, user ID, and sequence number seqX=[1] to authentication server 3 (step S65).

On the other hand, control means 321 in authentication server 3, upon receipt of the control message from mobile terminal 1, authenticates authentication key hash value [999] (challenge-word-2) included in the control message making use of authentication key authentication means 324 (step S66). Subsequently, control means 321 performs similar processing to that described above in accordance with the result of the authentication.

In the first embodiment described above, while the hash function is applied a smaller number of times for generating an authentication key which is later in the transmission order, the hash function may be applied a larger number of times for an authentication key which is later in the transmission order, in a manner contrary to the foregoing. Also, while a random number generated by random number generating means 322 is used for a challenge word in the foregoing description (steps S43, S49, and the like), any value may be used for a challenge word, such as a time at which a challenge word is generated, as long as it is difficult to predict.

Second Embodiment

Next, a second embodiment of the present invention will be described in detail. The second embodiment differs from the first embodiment in that an authentication server is responsible for a password-based authentication, an authentication proxy switch is responsible for an authentication key based authentication, and a health check (life and death confirmation) is made for a mobile terminal.

Figure 6:
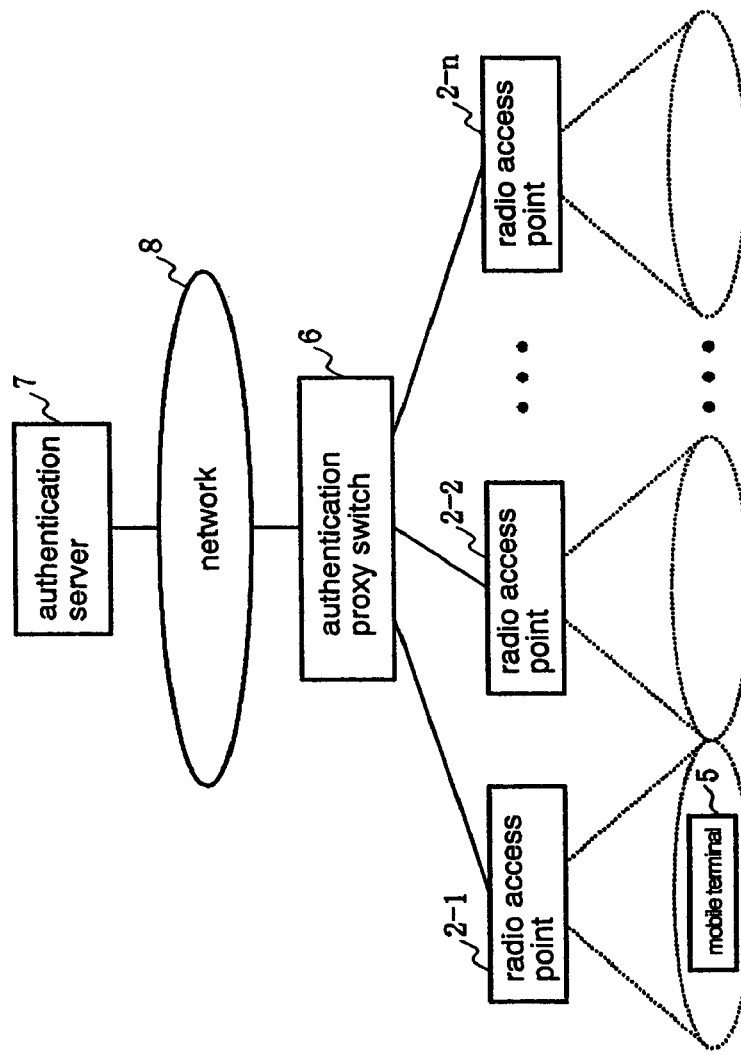
FIG. 6 is a block diagram generally illustrating an exemplary configuration of a second embodiment of the mobile wireless communication system according to the present invention.

FIG. 6 is a block diagram generally illustrating an exemplary configuration of the second embodiment of the mobile wireless communication system according to the present invention. Referring to FIG. 6, the mobile wireless communication system of the second embodiment comprises mobile terminal 5, a plurality of radio access points 2-1-2-$n$, authentication proxy switch 6 which is an authentication responsible device, and authentication server 7 which is another authentication responsible device, wherein authentication proxy switch 6 and authentication server 7 are interconnected through network 8 such as an IP network or the like. It should be understood that though there is only one mobile terminal 5 illustrated in FIG. 6, there are actually a plurality of mobile terminals existing in the system.

Mobile terminal 5 may be implemented by a personal computer (PC) or a personal digital assistant (PDA) which has a wireless interface represented by IEEE802.11, and has functions substantially similar to those of mobile terminal 1 in the first embodiment. However, mobile terminal 5 of this embodiment has an additional function of transmitting a control message not only at the time of a handover but also when a predetermined time (30 seconds in this embodiment) has elapsed from the previous transmission of a control message.

Figure 7:
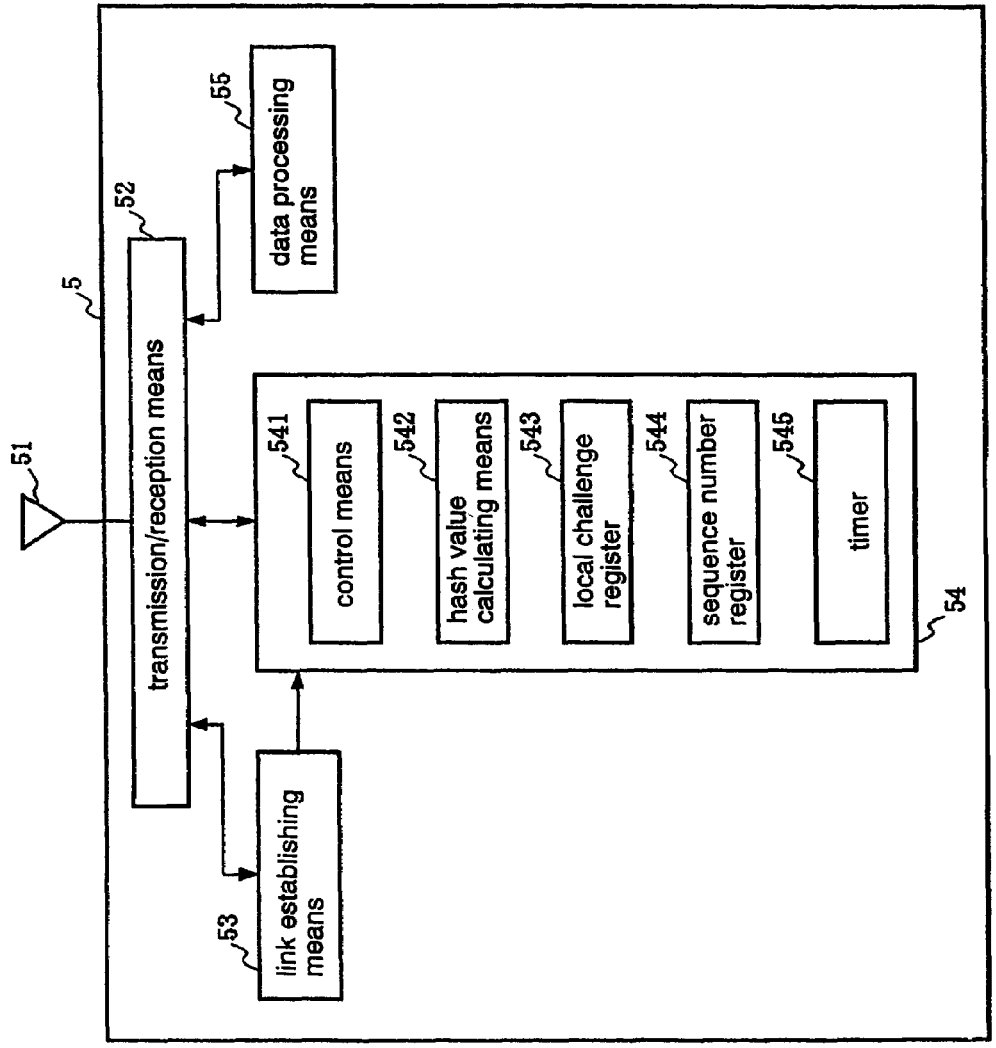
FIG. 7 is a block diagram illustrating an exemplary configuration of mobile terminal 5.

FIG. 7 illustrates an exemplary configuration of mobile terminal 5 in a block diagram form. Referring to FIG. 7, mobile terminal 5 comprises antenna 51, transmission/reception means 52, link establishment means 53, authentication requesting means 54, and data processing means 55.

Transmission/reception means 52, link establishment means 53, and data processing means 55 have similar functions to transmission/reception means 12, link establishing means 13, and data processing means 15 in the first embodiment, respectively.

Authentication requesting means 54 comprises control means 541, hash value calculating means 542, local challenge register 543, sequence number register 544, and timer 545.

Timer 545 has a function of generating a time-out signal to control means 5441 each time a predetermined time (30 seconds in this embodiment) elapses. However, when a reset signal is applied to control means 541, timer 545 generates the time-out signal after the lapse of 30 seconds from that time.

Control means 541 has the following functions (A)-(G):

(A) A function of transmitting an authentication request including a user ID (UID) to authentication proxy switch 6 when a link is established between mobile terminal 5 and radio access point 2-$i$ ($1 \leq i \leq n$) in an initial connection procedure. Assume in this embodiment that the user ID includes the MAC address and user name of mobile terminal 5.

(B) A function of holding local challenge local-challenge-1 for a first authentication cycle, returned from authentication proxy switch 6 in response to an authentication request in the initial connection procedure, in local challenge register 543 in the initial connection procedure.

(C) A function of applying a hash function once to a set of access challenge Access-challenge and a password to generate an encrypted password hash value (Access-challenge, password) making use of hash value calculating means 542 when challenge-word-1 for the first authentication cycle and access challenge Access-challenge are returned from authentication proxy switch 6 in the initial connection procedure, applying the hash function to local challenge local-challenge-1 an initially set number N of times (N=1000 in this embodiment) to generate an authentication key hash value [1000](local-challenge-1), and transmitting a control message, including the encrypted password hash value and authentication key hash value together with the user ID, to authentication server 7. For the hash function, a known one-way function is used, including MD5, SHA-1, and the like. Authentication proxy switch 6 and authentication server 7 also use the same hash function as mobile terminal 5.

(D) A function of setting an initial value [1] for sequence number seqX in sequence number register 544 when a link is established between mobile terminal 5 and radio access point 2-$i$ ($1 \leq i \leq n$) in the initial connection procedure.

(E) A function of applying the hash function to local challenge local-challenge-M for an M-th authentication cycle held in local challenge register 543 a number of times calculated by subtracting sequence number seqX held in sequence number register 544 from 1000 to generate an authentication key hash value [1000-seqX] (local-challenge-M), and transmitting a seqX-th control message in the M-th authentication cycle, including the generated authentication key, user ID, and sequence number seqX, to authentication proxy switch 6, when mobile terminal 5 moves between radio access points in the M-th authentication cycle after the completion of the initial connection procedure, or when a time-out signal is applied from timer 545.

(F) A function of incrementing sequence number seqX held in sequence number register 544 and generating a reset signal to timer 545 each time a control message is transmitted. Assume in this embodiment that sequence number seqX is incremented by one (+1) each time a control message is transmitted. Also, when sequence number seqX exceeds [999] as a result of the increment, the control means 541 determines that the next authentication cycle is entered, and sets [1] in sequence number register 544.

(G) A function of applying the hash function 1000 times to new local challenge local-challenge-M+1 for an (M+1)th authentication cycle, when it is sent from authentication server 6 in the M-th authentication cycle, to generate a new authentication key hash value [1000] (local-challenge-M+1), and transmitting a control message including the new authentication key as well to authentication proxy switch 6 when the control message is transmitted next time.

When mobile terminal 5 is implemented by a computer, a program has been recorded in a disk, a semiconductor memory, or another recording medium for implementing transmission/reception means 52, link establishing means 53, authentication requesting means 54, and data processing means 55. The computer reads the program and controls its operations in accordance with the program to implement transmission/reception means 52, link establishing means 53, authentication requesting means 54, and data processing means 55 on the computer itself.

Authentication proxy switch 6, which is implemented by a computer, contains a plurality of radio access points 2-1-2-$n$. Authentication proxy switch 6 has a function of performing an authentication based on an authentication key; a function of transmitting/receiving a control message; a function of switching data packets; a function of managing the location of a mobile terminal (under which radio access point a mobile terminal exists); a function of making a health check for a mobile terminal; and the like.

Figure 8:
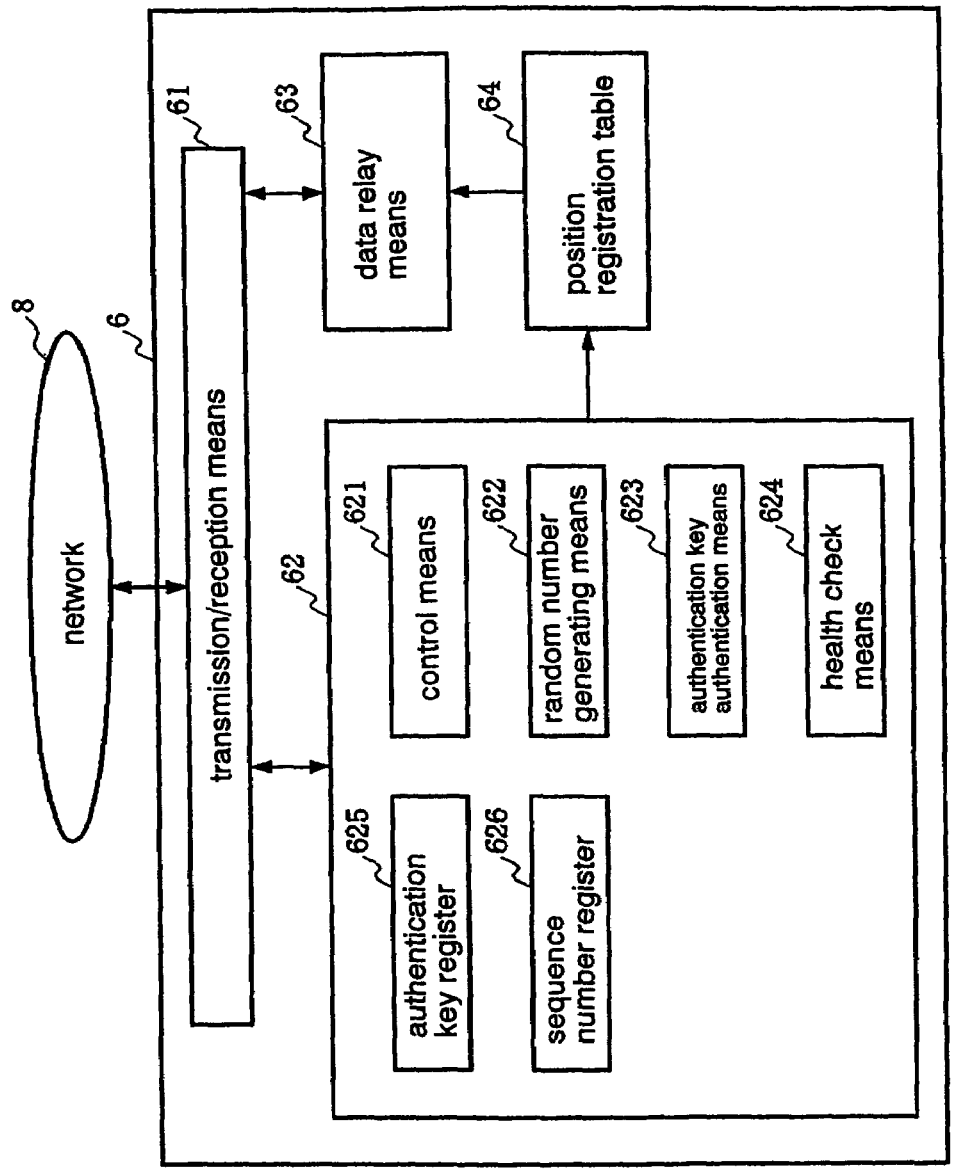
FIG. 8 is a block diagram illustrating an exemplary configuration of authentication proxy switch 6.

FIG. 8 illustrates an exemplary configuration of authentication proxy switch 6 in a block diagram form. Referring to FIG. 8, authentication proxy switch 6 comprises transmission/reception means 61, authentication means 62, data relay means 63, and position registration table 64.

Transmission/reception means 61 and data relay means 63 have similar functions to transmission/reception means 31 and data relay means 33 illustrated in FIG. 4, respectively.

Authentication means 62 comprises control means 621, random number generating means 622, authentication key authentication means 623, health check means 624, authentication key register 625, and sequence number register 626.

Control means 621 has functions shown in the following (H)-(M):

(H) A function of transmitting access request Access-Req including the user ID to authentication server 7 when an authentication request including a user ID is sent from mobile terminal 5 in the initial connection procedure, and generating local challenge local-challenge-1 for the first authentication cycle using random number generating means 622.

(I) A function of returning access challenge Access-challenge and local challenge local-challenge-1 to mobile terminal 5 when access challenge Access-challenge is returned from authentication server 7 in response to access request Access-Req.

(J) A function of transmitting access request Access-Req including the encrypted password hash value (Access-challenge, password) and user ID to authentication server 7 when a control message including the encrypted password hash value (Access-challenge, password), authentication key hash value [1000] (local-challenge-1), and user ID is transmitted from mobile terminal 5 in the initial connection procedure; authenticating the authentication key hash value [1000] (local-challenge-1) using authentication key authentication means 623; registering the MAC address of mobile terminal 5, authentication key, and current time in authentication key register 625 in correspondence to one another; and registering the MAC address of mobile terminal 5 and sequence number seqY=[0] in sequence number register 626 in correspondence to each other.

(K) A function of returning the result of an authentication to mobile terminal 5 when access accept Access-Accept is returned from authentication server 7 in response to access request Access-Req.

(L) A function of generating new local challenge local-challenge-M+1 for an (M+1)th authentication cycle using random number generating means 622 when sequence number seqY is [0] in the M-th authentication cycle, and notifying mobile terminal 5 of the successful authentication together with the new challenge word.

(M) A function of authenticating mobile terminal 5 based on an authentication key using authentication key authentication means 623 when a control message including the authentication key, user ID, and sequence number seqX is sent from mobile terminal 5 in the M-th authentication cycle (mobile terminal 5 transmits a control message in the event of a handover), replacing the radio access point number registered in position registration table 64 in correspondence to the MAC address of mobile terminal 5 with a radio access point number of a radio access point which relays the control message and notifying mobile terminal 5 of the successful authentication when the authentication is successful, replacing the authentication key and time registered in authentication key register 625 in correspondence to the MAC address of mobile terminal 5 with the authentication key in the control message and current time, respectively, and updating sequence number seqY registered in sequence number register 626 in correspondence to the MAC address of mobile terminal 5 to seqX. Also, a function of deleting information related to mobile terminal 5 from position registration table 64, authentication key register 625, and sequence number register 626, and notifying mobile terminal 5 of the failed authentication when the authentication fails.

Health check means 624 has a function of making a health check for a mobile terminal based on a time at which a control message was received the last time from the mobile terminal, held in authentication key register 625, and on the current time.

When authentication proxy switch 6 is implemented by a computer, a program has been recorded on a disk, a semiconductor memory, or another recording medium for implementing transmission/reception means 61, authentication means 62, and data relay means 63. The computer reads the program to control the operations of the computer itself in accordance with the program to implement transmission/reception means 61, authentication means 62, and data relay means 63 on the computer.

Authentication server 7, which is an authentication server represented by a RADIUS server that authenticates in accordance with a RADIUS (Remote Authentication Dial In User Server) protocol, has a function of authenticating in accordance with a password through network 8.

Figure 9:
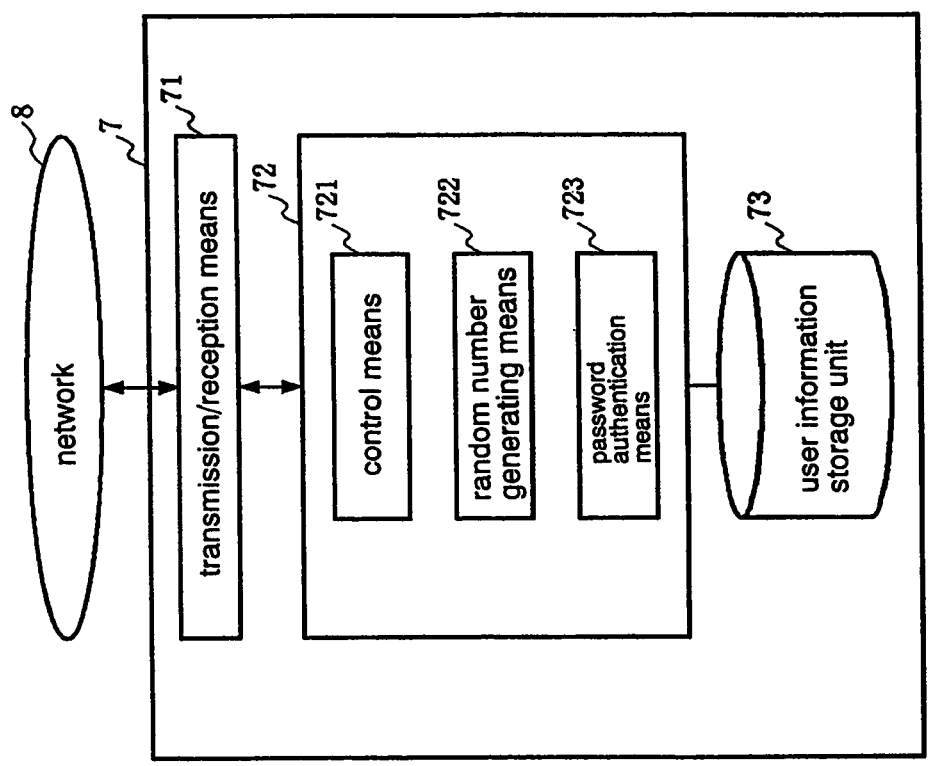
FIG. 9 is a block diagram illustrating an exemplary configuration of authentication server 7.

FIG. 9 illustrates an exemplary configuration of authentication server 7 in a block diagram form. Referring to FIG. 9, authentication server 7 comprises transmission/reception means 71, authentication means 72, and user information storage unit 73.

Transmission/reception means 71 has a function of communicating data through network 8. User information storage unit 73 is registered with a password in correspondence to the MAC address and user name of a mobile terminal.

Authentication means 72 comprises control means 721, random number generating means 722, and password authentication means 723.

Control means 721 has a function of generating access challenge Access-challenge using random number generating means 722 when access request Access-Req is sent from authentication proxy switch 6, and a function of performing a password-based authentication using password authentication means 723 when access request Access-Req including an encrypted password hash value (Access-challenge, password) is sent from authentication proxy switch 6.

When authentication server 7 is implemented by a computer, a program has been recorded in a disk, a semiconductor memory, or another recording medium for implementing transmission/reception means 71 and authentication means 72. The computer reads the program and controls its operations in accordance with the program to implement transmission/reception means 71 and authentication means 72 on the computer itself.

Next, the operation of the mobile wireless communication system according to the second embodiment will be described in detail.

Figure 10:
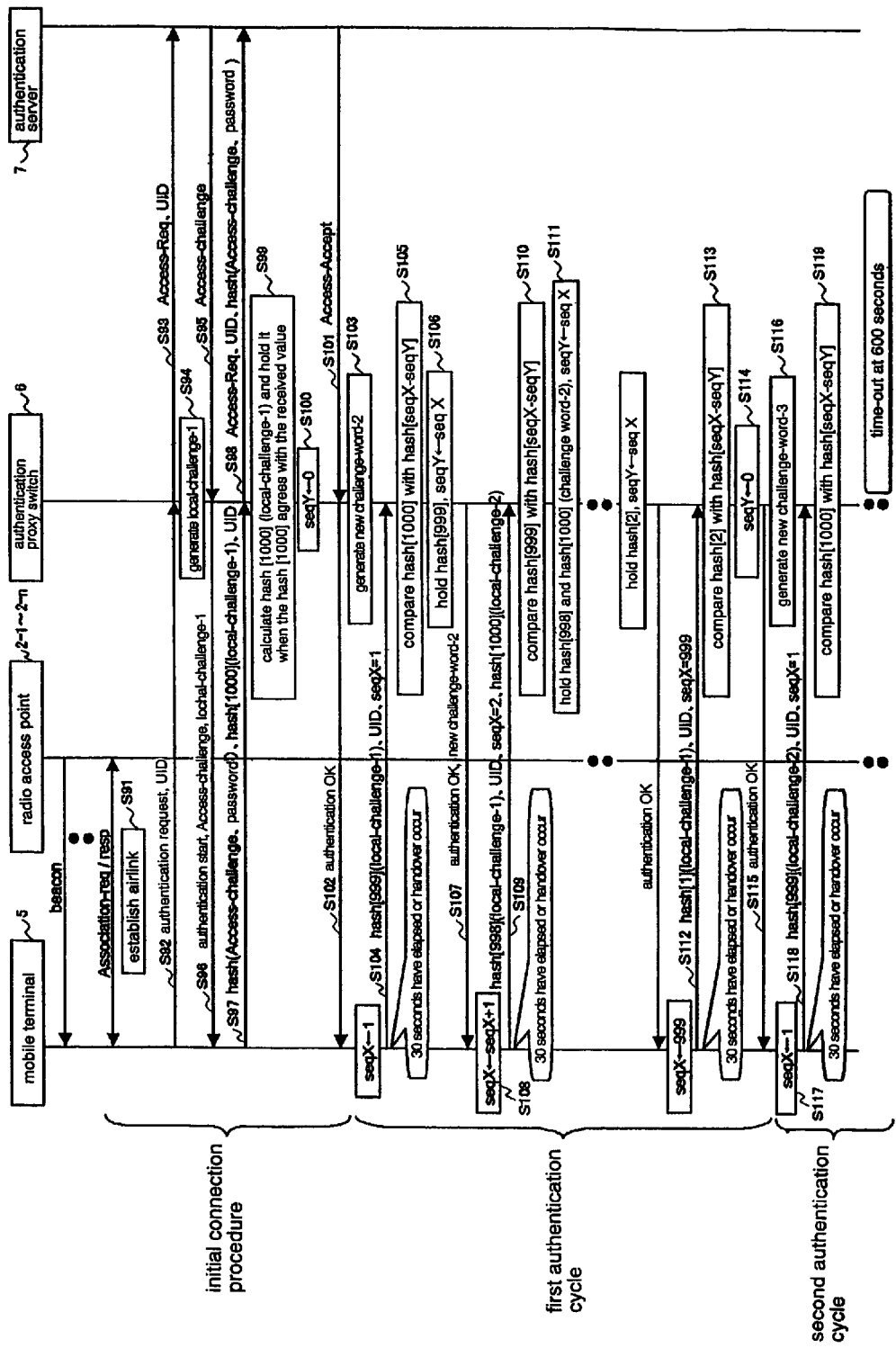
FIG. 10 is a flow chart illustrating an exemplary process in the second embodiment.

When a communication is started from mobile terminal 5 which exists in a coverage area of radio access point 2-$i$, a link is first established in accordance with a wireless scheme (step S91 in FIG. 10). When a link is established in a wireless section, control means 541 sets an initial value [1] for sequence number seqX in sequence number register 544. After the establishment of a wireless link, the initial connection procedure is started.

In the initial connection procedure, control means 541 in mobile terminal 5 first transmits an authentication request including the user ID to authentication proxy switch 6 through radio access point 2-$i$ (step S92).

Control means 621 in authentication proxy switch 6 transmits access request Access-Req including the user ID to authentication server 7 using the RADIUS protocol (step S93), and generates local challenge local-challenge-1 for a first authentication cycle using random number generating means 622 (step S94).

Control means 721 in authentication server 7, upon receipt of access request Access-Req, generates access challenge Access-challenge using random number generating means 722, and sends the generated access challenge to authentication proxy switch 6 (step S95).

Control means 621 in authentication proxy switch 6 sends an authentication start message, including access challenge Access-challenge sent from authentication server 7 and local challenge local-challenge-1 generated at step S94, to mobile terminal 5 (step S96).

Upon receipt of the authentication start message, control means 541 in mobile terminal 5 generates an encrypted password hash value (Access-challenge, password) and an authentication key hash value [1000] (local-challenge-1) making use of hash value calculating means 542, and transmits a control message, including the generated encrypted pass word hash value and authentication key hash value together with the user ID, to authentication proxy switch 6 (step S97). Further, at step S97, control means 541 sets local challenge local-challenge-1 sent from authentication proxy switch 6 in local challenge register 543. The encrypted password hash value (Access-challenge, password) is a hash value generated by applying a hash function once to a set of the access challenge and password, while the authentication key hash value [1000] (local-challenge-1) is a hash value generated by applying the hash function an initially set number N of times (1000 times in this embodiment) to the local challenge.

Control means 621 in authentication proxy switch 6 transmits access request Access-Req including the encrypted password hash value (Access-challenge, password) and user ID within the control message, sent from mobile terminal 5, to authentication server 7 (step S98).

Subsequently, control means 621 authenticates mobile terminal 5 in accordance with the authentication key using authentication key authentication means 623 (step S99). Specifically, authentication key authentication means 623 applies the hash function 1000 times to local challenge local-challenge-1 generated at step S94 to generate a hash value which is compared with the received authentication key, and determines that the authentication is successful when there is a match between both values. Then, when the authentication is successful, control means 321 registers position registration table 64 with the MAC address of mobile terminal 5 and the radio access point number of a radio access point, under which mobile terminal 5 is currently placed, in correspondence to each other, and registers authentication key register 625 with the authentication key hash value [1000] (local-challenge-1), the MAC address of mobile terminal 5, and the current time in correspondence to one another (step S99).

Subsequently, control means 621 sets sequence number seqY=[0] in sequence number register 626 in correspondence to the MAC address of mobile terminal 5 (step S100).

On the other hand, control means 721 in authentication server 7, upon receipt of access request Access-Req which includes the encrypted password hash value (Access-challenge, password) and the user ID of mobile terminal 5 at step S98, performs a password-based authentication using password authentication means 723, and returns access accept Access-Accept to authentication proxy switch 6 when the authentication is successfully performed (step S101).

Control means 621 in authentication proxy switch 6, upon receipt of access accept Access-Accept, notifies mobile terminal 5 of the successful authentication on the condition that the authentication key based authentication has been successful at step S99 (step S102). In this way, the initial connection procedure is completed.

As the initial connection procedure is completed, a first authentication cycle is entered. As the first authentication cycle is entered, control means 621 in authentication proxy switch 6 generates new local challenge local-challenge-2 for the next second authentication cycle (step S103).

On the other hand, control means 541 in mobile terminal 5 generates an authentication key hash value [999] (local-challenge-1) making use of hash value calculating means 542 when a time-over signal is applied from timer 545 (when 30 seconds have elapsed from the preceding transmission of a control message) after the first authentication cycle has been entered, or when a handover occurs, and transmits to authentication proxy switch 6 a control message including the generated authentication key, user ID, and sequence number seqX=[1] held in sequence number register 544 (step S104). Subsequently, control means 541 generates a reset signal to timer 545, and increments sequence number seqX held in sequence number register 544 by one (+1) to [2] (step S108).

Upon receipt of the control message from mobile terminal 5, control means 621 in authentication proxy switch 6 authenticates the authentication key hash value [999] (local-challenge-1) included in the control message making use of authentication key authentication means 623 (step S105). Specifically, authentication key authentication means 623 applies the hash function a number of times (seqX-seqY) to the authentication key hash value [999] (local-challenge-1) to generate a hash value (in this example, the hash function is applied once to generate the hash value because seqX=1 and seqY=0), compares the generated hash value with the authentication key hash value [1000] (local-challenge-1) registered in authentication key register 625 in correspondence to the MAC address of mobile terminal 5, and determines that the authentication is successful when there is a match between both values. Here, the hash function is applied the number of times (seqX-seqY) in order that subsequent authentication can be correctly carried out even if a control message fails to reach authentication proxy switch 6 due to a possible trouble on a transmission path or even if a response to the control image does not reach mobile terminal 5.

Then, when the authentication is successful, control means 621 replaces the radio access point number of radio access point 2-*i* registered in position registration table 64 in correspondence to the MAC address of mobile terminal 5 with the radio access point number of radio access point 2-*j* to which mobile terminal 5 has moved, replaces the authentication key and time registered in authentication key register 625 in correspondence to the MAC address of mobile terminal 5 with the authentication key hash value [999] (local-challenge-1) in the control message and the current time, respectively, and replaces the sequence number registered in sequence number register 626 in correspondence to the MAC address of mobile terminal 5 with sequence number seqX=[1] included in the control message (step S106). Then, control means 621 notifies mobile terminal 5 of the successful authentication, and transmits new local challenge local-challenge-2 generated at step S103 to mobile terminal 5 (step S107). Control means 541 in mobile terminal 5 registers new local challenge local-challenge-2, when it is sent thereto, in local challenge register 543. Consequently, local challenge register 543 holds two local challenges local-challenge-1, local-challenge-2 for the first and second authentication cycles. When authentication key authentication means 623 fails the authentication at step S105, control means 621 deletes all information related to mobile terminal 5 registered in authentication key register 625, sequence number register 626, and position registration table 64, and then notifies mobile terminal 5 of the failed authentication.

Subsequently, control means 541 in mobile terminal 5 generates an authentication key hash value [998] (local-challenge-1) and a new authentication key hash value [1000] (local-challenge-2) making use of hash value calculating means when it is applied with a time-out signal from timer 545 or when a handover occurs, and transmits to authentication proxy switch 6 a control message which includes the generated authentication key hash value and new authentication key hash value, the user ID, and sequence number seqX=[2] held in sequence number register 544 (step S109).

Upon receipt of the control message including the new authentication key hash value [1000] (local-challenge-2) in addition to the authentication key hash value [998] (local-challenge-1), control means 621 in authentication proxy switch 6 authenticates the authentication key hash value [998] (local-challenge-1) using authentication key authentication means 632 in a manner similar to step S105 (step S110). Then, when the authentication is successful, control means 621 replaces the authentication key and time registered in authentication key register 625 in correspondence to the MAC address of mobile terminal 5 with the authentication key hash value [998] (local-challenge-1), new authentication key hash value [1000] (local-challenge-2), and current time, and replaces the sequence number for mobile terminal 5 held in sequence number register 626 with sequence number seqX=[2] included in the control message (step S111). Then, control means 621 notifies mobile terminal 5 of the successful authentication. When control means 621 receives the control message including the new authentication key hash value [1000] (challenge-word-2) and succeeds in the authentication as described above, control means 621 will not transmit new challenge-word-2 to mobile terminal 5 until the next authentication cycle is entered. However, if the new authentication key hash value [1000] (local-challenge-2) is not included in a control message received for the first time after new local challenge local-challenge-2 was transmitted at step S107, control means 621 performs an authentication in accordance with the authentication key hash value [1000-seqX] (local-challenge-1) included in the control message, and notifies mobile terminal 5 of the successful authentication together with new local-challenge-2 on the condition that the authentication is successful.

Subsequently, processing similar to the foregoing is performed each time 30 seconds elapse after the previous transmission of a control message or each time a handover occurs.

Then, after transmitting a control message including an authentication key hash value [1] (local-challenge-1) at step S112, control means 541 increments sequence number seqX by one (+1), in which case sequence number seqX reaches [1000], so that control means 541 recognizes that the second authentication cycle has been entered, and sets [1] in sequence number register 544 (step S117). Also, at step S117, control means 541 deletes local challenge local-challenge-1, which has been used to generate the authentication key in the first authentication cycle, from local challenge register 543, such that control means 541 uses new local challenge local-challenge-2 for the second authentication cycle held in challenge word register 543 when it generates an authentication key from then on.

On the other hand, control means 621 in authentication proxy switch 6, when succeeding in the authentication at step S113, attempts to replace the sequence number for mobile terminal 5 registered in sequence number register 626 with sequence number seqX=[999] sent from mobile terminal 5, but since sequence number seqX sent thereto is [999], control means 621 recognizes that the next authentication cycle (second authentication cycle) has been entered, and registers seqY=[0] in sequence number register 626 (step S114). Then, control means 621 notifies mobile terminal 5 of the successful authentication, and generates new local challenge local-challenge-3 for use in a third authentication cycle using random number generating means 622 (steps S115, S116).

Control means 541 of mobile terminal 5 generates an authentication key hash value [999] (local-challenge-2) using hash value calculating means 542 when an interrupt signal is applied thereto from timer 545 or when a handover occurs after the second authentication cycle has been entered, and transmits to authentication proxy switch 6 a control message which includes the generated authentication key hash value, user ID, and sequence number seqX=[1] (step S118).

Upon receipt of the control message from mobile terminal 5, control means 621 in authentication proxy switch 6 authenticates authentication key hash value [999] (local-challenge-2) included in the control message making use of authentication key authentication means 623 (step S119). Then, control means 621 performs similar processing to the foregoing in accordance with the result of the authentication.

Next, health check processing performed by health check means 624 will be described with reference to a flow chart of FIG. 11.

Figure 11:
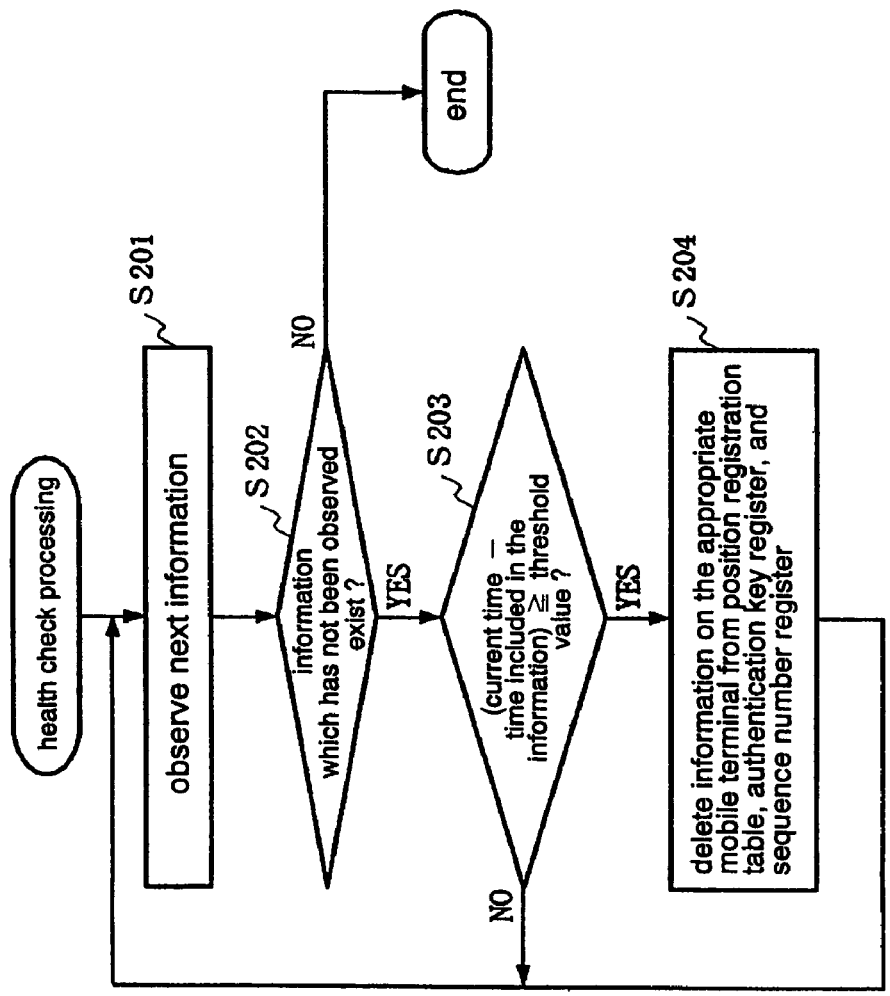
FIG. 11 is a flow chart illustrating an exemplary process of health check processing.

Health check means 624 executes health check processing illustrated in the flow chart of FIG. 11 at intervals of a predetermined time (for example, 30 seconds). Health check means 624 observes one of information on each mobile terminal (including the MAC address, authentication key, and latest time at which the authentication key was received) held in authentication key register 625 (step S201), and determines whether or not a difference between the latest time at which the authentication key was received and the current time is equal to or larger than a threshold value (for example, 600 seconds) (step S203).

If the difference is below the threshold (NO at step S203), health check means 624 returns to step S201 to observe information on the next mobile terminal. Conversely, if the difference is equal to or larger than the threshold (YES at step S203), health check means 624 deletes information on the appropriate mobile terminal from position registration table 64, authentication key register 625, and sequence number register 626 on the assumption that the mobile terminal has moved out of the coverage area or the mobile terminal has been powered off (step S204). Specifically, health check means 624 deletes the information observed at step S201 from authentication key register 625, and searches position registration table 64 and sequence number register 626 with a key which is the MAC address within the information observed at step S201, and deletes the information including the MAC address from position registration table 64 and sequence number register 626. Subsequently, health check means 624 returns to step S201 to observe the next information. The foregoing processing is repeatedly executed, and when there is no more information which has not been observed (NO at step S202), health check means 624 terminates the processing.

In the second embodiment described above, a control message is transmitted from mobile terminal 5 to authentication proxy switch 6 when a handover occurs or after the lapse of 30 seconds, but instead a control message may be transmitted only when a handover occurs. Also, while the hash function is applied a smaller number of times for generating an authentication key which is later in the transmission order, the hash function may be applied a larger number of times for an authentication key which is later in the transmission order, in a manner contrary to the foregoing. Also, while a random number generated by random number generating means 622 is used for a local challenge in the foregoing description (steps S94, S103, and the like), any value may be used for a challenge word, such as a time at which a challenge word is generated, as long as it is difficult to predict.

While preferred embodiments of the present invention have been described using specific terms, such description is for illustrative purposes only, and it is to be understood that changes and variations may be made without departing from the spirit or scope of the following claims.

What is claimed is:

1. An authentication method for use in a mobile wireless communication system which includes a mobile terminal, a plurality of radio access points, and an authentication server, wherein said mobile terminal makes communications through one of said radio access points, said method comprising the steps of:

said authentication server transmitting a challenge word to said mobile terminal;

said mobile terminal holding the challenge word sent from said authentication server, and transmitting an N-th authentication key to said authentication server when an N-th handover occurs, said N-th authentication key being generated by applying a hash function to the held challenge word a number of times different by a predetermined number of times from an (N−1)th authentication key transmitted when an (N−1)th handover has occurred;

said authentication server authenticating the validity of said mobile terminal when the N-th authentication key is sent from said mobile terminal, based on whether or not the N-th authentication key and the held (N−1)th authentication key have a predetermined relationship, and holding the N-th authentication key in place of the (N−1)th authentication key when the authentication is successful; and said authentication server generating a new challenge word after an N-th authentication is completed but prior to an (N+1)th handover.

2. The authentication method according to claim 1, wherein:

said hash function is a one-way function, said N-th authentication key is generated by applying the hash function to the challenge word a number of times smaller by one than said (N−1)th authentication key, and said authentication server determines a successful authentication when the result of applying the hash function once to the N-th authentication key sent from said mobile terminal matches the held (N−1)th authentication key.

3. The authentication method according to claim 1, further comprising the steps of:

when the N-th handover occurs, said mobile terminal transmitting to said authentication server the N-th authentication key generated by applying the hash function to the challenge word a number of times smaller by one than the (N−1)th authentication key transmitted when the (N−1)th handover occurred, and an N-th sequence number which is larger by one than an (N−1)th sequence number transmitted when the (N−1)th handover occurred; and said authentication server applying the hash function to the N-th authentication key a number of times in accordance with a difference between a held sequence number and the N-th sequence number when the N-th authentication key and sequence number are sent from said mobile terminal, determining that the authentication is successful when the result of applying the hash function to the N-th authentication key matches the held authentication key, and holding the N-th authentication key and sequence number in place of the held authentication key and sequence number.

4. An authentication method for use in a mobile wireless communication system which includes a mobile terminal, a plurality of radio access points, an authentication server, and an authentication proxy switch disposed between said authentication server and said plurality of radio access points, wherein said mobile terminal makes communications through one of said radio access points, said method comprising the steps of:

said authentication server authenticating the validity of said mobile terminal based on a password sent from said mobile terminal;

said authentication proxy switch transmitting a local challenge to said mobile terminal;

said mobile terminal holding the local challenge sent from said authentication proxy switch, and transmitting an N-th authentication key to said authentication proxy switch when an N-th handover occurs, said N-th authentication key being generated by applying a hash function to the held local challenge a number of times different by a predetermined number of times from an (N−1)th authentication key transmitted when an (N−1)th handover occurred;

said authentication proxy switch authenticating the validity of said mobile terminal based on whether or not the N-th authentication key and the (N−1)th authentication key held therein have a predetermined relationship, when the N-th authentication key is sent from said mobile terminal, and holding the N-th authentication key in place of the (N−1)th authentication key when the authentication is successful; and said authentication proxy switch generating and transmitting to said mobile terminal a new local challenge after an N-th authentication is completed but prior to an (N+1)th handover.

5. The authentication method according to claim 4, wherein:

said hash function is a one-way function, said N-th authentication key is generated by applying the hash function to the challenge word a number of times smaller by one than said (N−1)th authentication key, and said authentication proxy switch determines a successful authentication when the result of applying the hash function once to the N-th authentication key sent from said mobile terminal matches the held (N−1)th authentication key.

6. The authentication method according to claim 4, further comprising the steps of:

when the N-th handover occurs, said mobile terminal transmitting to said authentication proxy switch the N-th authentication key generated by applying the hash function to the local challenge a number of times smaller by one than the (N−1)th authentication key transmitted when the (N−1)th handover occurred, and an N-th sequence number which is larger by one than an (N−1)th sequence number transmitted when the (N−1)th handover occurred; and said authentication proxy switch applying the hash function to the N-th authentication key a number of times in accordance with a difference between a held sequence number and the N-th sequence number when the N-th authentication key and sequence number are sent from said mobile terminal, determining that the authentication is successful when the result of applying the hash function to the N-th authentication key matches the held authentication key, and holding the N-th authentication key and sequence number in place of the held authentication key and sequence number.

7. A mobile wireless communication system including a mobile terminal, a plurality of radio access points, and an authentication server, said mobile terminal making communications through one of said radio access points, wherein:

said authentication server comprises authentication means for transmitting a challenge word to said mobile terminal, authenticating the validity of said mobile terminal when the N-th authentication key is sent from said mobile terminal, based on whether or not the N-th authentication key and the held (N−1)th authentication key have a predetermined relationship, and holding the N-th authentication key in place of the (N−1)th authentication key when the authentication is successful, said authentication server farther comprising a random number generating means for generating a new challenge word after an N-th authentication is completed but prior to an (N+1)th handover; and said mobile terminal comprising authentication requesting means for holding the challenge word sent from said authentication server, and transmitting an N-th authentication key to said authentication server when an N-th handover occurs, said N-th authentication key being generated by applying a hash function to the held challenge word a number of times different by a predetermined number of times from an (N−1)th authentication key transmitted when an (N−1)th handover has occurred.

8. The mobile wireless communication system according to claim 7, wherein:
said hash function is a one-way function,
said N-th authentication key is generated by applying the hash function to the challenge word a number of times smaller by one than said (N−1)th authentication key, and
said authentication means determines a successful authentication when the result of applying the hash function once to the N-th authentication key sent from said mobile terminal matches the held (N−1)th authentication key.

9. The mobile wireless communication system according to claim 7, wherein:
said authentication requesting means is configured to transmit, when the N-th handover occurs, to said authentication server the N-th authentication key generated by applying the hash function to the challenge word a number of times smaller by one than the (N−1)th authentication key transmitted when the (N−1)th handover occurred, and an N-th sequence number which is larger by one than an (N−1)th sequence number transmitted when the (N−1)th handover occurred; and
said authentication means is configured to apply the hash function to the N-th authentication key a number of times in accordance with a difference between a held sequence number and the N-th sequence number when the N-th authentication key and sequence number are sent from said mobile terminal, determine that the authentication is successful when the result of applying the hash function to the N-th authentication key matches the held authentication key, and hold the N-th authentication key and sequence number in place of the held authentication key and sequence number.

10. A mobile wireless communication system including a mobile terminal, a plurality of radio access points, an authentication server, and an authentication proxy switch disposed between said authentication server and said plurality of radio access points, said mobile terminal making communications through one of said radio access points, wherein:
said authentication server comprises authentication server resident authentication means for authenticating the validity of said mobile terminal based on a password sent from said mobile terminal;
said authentication proxy switch comprises authentication proxy switch resident authentication means for transmitting a local challenge to said mobile terminal, authenticating the validity of said mobile terminal based on whether or not an N-th authentication key and an (N−1)th authentication key held therein have a predetermined relationship, when the N-th authentication key is sent from said mobile terminal, and holding the N-th authentication key in place of the (N−1)th authentication key when the authentication is successful, said authentication proxy switch further comprising a random number generating means for generating a new local challenge after an N-th authentication is completed but prior to an (N+1)th handover; and
said mobile terminal comprises authentication requesting means for holding the local challenge sent from said authentication proxy switch, and transmitting the N-th authentication key to said authentication proxy switch when an N-th handover occurs, said N-th authentication key being generated by applying a hash function to the held local challenge a number of times different by a predetermined number of times from the (N−1)th authentication key transmitted when an (N−1)th handover occurred.

11. The mobile wireless communication system according to claim 10, wherein:
said hash function is a one-way function,
said N-th authentication key is generated by applying the hash function to the challenge word a number of times smaller by one than said (N−1)th authentication key, and
said authentication proxy switch resident authentication means determines a successful authentication when the result of applying the hash function once to the N-th authentication key sent from said mobile terminal matches the held (N−1)th authentication key.

12. The mobile wireless communication system to claim 10, wherein:
said authentication requesting means is configured to transmit, when the N-th handover occurs, to said authentication server the N-th authentication key generated by applying the hash function to the local challenge a number of times smaller by one than the (N−1)th authentication key transmitted when the (N−1)th handover occurred, and an N-th sequence number which is larger by one than an (N−1)th sequence number transmitted when the (N−1)th handover occurred; and
said authentication proxy switch resident authentication means is configured to apply the hash function to the N-th authentication key a number of times in accordance with a difference between a held sequence number and the N-th sequence number when the N-th authentication key and sequence number are sent from said mobile terminal, determine that the authentication is successful when the result of applying the hash function to the N-th authentication key matches the held authentication key, and hold the N-th authentication key and sequence number in place of the held authentication key and sequence number.

13. An authentication server comprising:
authentication means responsive to an N-th authentication key sent thereto from a mobile terminal which transmits the N-th authentication key when an N-th handover occurs, said N-th authentication key being generated by applying a hash function to a challenge word a number of times different by a predetermined number of times from an (N−1)th authentication key transmitted when an (N−1)th handover has occurred, for authenticating the validity of said mobile terminal based on whether or not the N-th authentication key and the held (N−1)th authentication key have a predetermined relationship, and holding the N-th authentication key in place of the (N−1)th authentication key when the authentication is successful ;and
a random number generating means for generating a new challenge word after an N-th authentication is completed but prior to an (N+1)th handover.

14. The authentication server according to claim 13, wherein:
said hash function is a one-way function,
said N-th authentication key is generated by applying the hash function to the challenge word a number of times smaller by one than said (N−1)th authentication key, and
said authentication means is configured to determine a successful authentication when the result of applying the hash function once to the N-th authentication key sent from said mobile terminal matches the held (N−1)th authentication key.

15. The authentication server according to claim 13, wherein:
said mobile terminal is configured to transmit, when the N-th handover occurs, to said authentication server the N-th authentication key generated by applying the hash function to the challenge word a number of times smaller by one than the (N−1)th authentication key transmitted when the (N−1)th handover occurred, and an N-th sequence number which is larger by one than an (N−1)th sequence number transmitted when the (N−1)th handover occurred; and said authentication means is configured to apply the hash function to the N-th authentication key a number of times in accordance with a difference between a held sequence number and the N-th sequence number when the N-th authentication key and sequence number are sent from said mobile terminal, determine that the authentication is successful when the result of applying the hash function to the N-th authentication key matches the held authentication key, and hold the N-th authentication key and sequence number in place of the held authentication key and sequence number.

16. An authentication proxy switch comprising authentication means responsive to an N-th authentication key sent from a mobile terminal which transmits an N-th authentication key to said authentication proxy switch when an N-th handover occurs, said N-th authentication key being generated by applying a hash function to a local challenge a number of times different by a predetermined number of times from an (N−1)th authentication key transmitted when an (N−1)th handover occurred, for authenticating the validity of said mobile terminal based on whether or not the N-th authentication key and the (N−1)th authentication key held therein have a predetermined relationship, and holding the N-th authentication key in place of the (N−1)th authentication key when the authentication is successful; and a random number generating means for generating a new local challenge after an N-th authentication is completed but prior to an (N+1)th handover.

17. The authentication proxy switch according to claim 16, wherein:

said hash function is a one-way function, said N-th authentication key is generated by applying the hash function to the challenge word a number of times smaller by one than said (N−1)th authentication key, and said authentication means determines a successful authentication when the result of applying the hash function once to the N-th authentication key sent from said mobile terminal matches the held (N−1)th authentication key.

18. The authentication proxy switch according to claim 16, wherein:

said mobile terminal is configured to transmit, when the N-th handover occurs, to said authentication server the N-th authentication key generated by applying the hash function to the local challenge a number of times smaller by one than the (N−1)th authentication key transmitted when the (N−1)th handover occurred, and an N-th sequence number which is larger by one than an (N−1)th sequence number transmitted when the (N−1)th handover occurred; and said authentication means is configured to apply the hash function to the N-th authentication key a number of times in accordance with a difference between a held sequence number and the N-th sequence number when the N-th authentication key and sequence number are sent from said mobile terminal, determine that the authentication is successful when the result of applying the hash function to the N-th authentication key matches the held authentication key, and hold the N-th authentication key and sequence number in place of the held authentication key and sequence number.

\* \* \* \* \*